(12) United States Patent
Burdick et al.

(10) Patent No.: US 10,651,534 B2
(45) Date of Patent: May 12, 2020

(54) ANTENNA WITH SENSORS FOR ACCURATE POINTING

(71) Applicant: ViaSat Inc., Carlsbad, CA (US)

(72) Inventors: Clifford K. Burdick, Vista, CA (US); Kurt A. Zimmerman, Dunwoody, GA (US); Kevin House, Gilbert, AZ (US); David H. Irvine, Carlsbad, CA (US)

(73) Assignee: Viasat, Inc., Carlsbad, CA (US)

( * ) Notice: Subject to any disclaimer, the term of this patent is extended or adjusted under 35 U.S.C. 154(b) by 212 days.

(21) Appl. No.: 15/951,877

(22) Filed: Apr. 12, 2018

(65) Prior Publication Data

US 2018/0233802 A1     Aug. 16, 2018

Related U.S. Application Data

(63) Continuation of application No. 14/730,539, filed on Jun. 4, 2015, now Pat. No. 9,966,650.

(51) Int. Cl.
*H01Q 1/12* (2006.01)
*H01Q 19/13* (2006.01)

(52) U.S. Cl.
CPC ......... *H01Q 1/1257* (2013.01); *H01Q 19/132* (2013.01)

(58) Field of Classification Search
CPC .... H01Q 1/1257; H01Q 1/125; H01Q 1/3275; H01Q 3/08; H01Q 3/04
USPC ....................................................... 342/359
See application file for complete search history.

(56) References Cited

U.S. PATENT DOCUMENTS

| 6,937,188 | B1 | 8/2005 | Saunders et al. |
| 8,314,735 | B2 | 11/2012 | Park |
| 8,789,116 | B2 | 7/2014 | Miller et al. |
| 2005/0003873 | A1 | 1/2005 | Naidu et al. |
| 2010/0315288 | A1* | 12/2010 | Liu .......................... G01S 3/40 342/359 |
| 2011/0111715 | A1 | 5/2011 | Buer et al. |

(Continued)

FOREIGN PATENT DOCUMENTS

| CN | 101938287 A | 1/2011 |
| CN | 103064429 A | 4/2013 |

(Continued)

OTHER PUBLICATIONS

Kim, Myeongkyun; Precise Attitude Control System Design for the Tracking of Parabolic Satellite Antenna, International Journal of Smart Home, vol. 7, No. 5 (2013), pp. 275-290.

(Continued)

*Primary Examiner* — Harry K Liu
(74) *Attorney, Agent, or Firm* — Holland & Hart LLP

(57) ABSTRACT

Determining movement for alignment of a satellite antenna using accelerometer data and gyroscope data of the satellite antenna. Described techniques include receiving accelerometer data for a first time period from an accelerometer mounted on the antenna and analyzing the accelerometer data to determine a movement time window for a movement event of the antenna. The techniques may include receiving gyroscope data for the first time period from a gyroscope mounted on the antenna and analyzing the gyroscope data during the movement time window to determine an amount of movement of the antenna due to the movement event.

26 Claims, 15 Drawing Sheets

(56) References Cited

U.S. PATENT DOCUMENTS

2012/0001816 A1\* 1/2012 Blaney .................. H01Q 25/00
 343/765
2012/0223860 A1 9/2012 Leclercq
2013/0271320 A1\* 10/2013 Trerise ................ H01Q 1/1257
 342/359

FOREIGN PATENT DOCUMENTS

| CN | 103471584 A | 12/2013 |
| CN | 103594797 A | 2/2014 |
| CN | 203550963 U | 4/2014 |
| GB | 2488388 A | 8/2012 |

OTHER PUBLICATIONS

KVH Industries, Inc., TracVision RV1 In-Motion Satellite TV Antenna System, www.kvh.com/Leisure/Rv-Systems/Television/Single-Cable-Systems/TracVision-RV1.aspx.

\* cited by examiner

ANTENNA WITH SENSORS FOR ACCURATE POINTING

CROSS REFERENCES

The present Application for patent claims priority to U.S. patent application Ser. No. 14/730,539 by BURDICK, et al., entitled "ANTENNA WITH SENSORS FOR ACCURATE POINTING," filed Jun. 4, 2015, the entirety of which is incorporated by reference herein.

BACKGROUND

A directional antenna is typically aligned upon deployment to the location the antenna is to be used. The alignment process may include pointing the antenna in a general area of a target antenna (e.g., on a geostationary satellite) and partially fixing the antenna to an object (e.g., ground, a building or other structure, etc.) on which it is to be mounted. An alignment process may include an orthogonal search (e.g., azimuth and elevation, etc.) based on received signal strength of a signal from the target antenna. For example, a series of feedback steps using the received signal strength may be used to make adjustments to an azimuth alignment of the antenna. Next, a series of feedback steps using the signal strength may be used to make adjustments to the elevation alignment of the antenna. Once an acceptable alignment is achieved, an installer may fix the mounted position of the antenna Common problems that occur using these alignment techniques include difficulty in providing feedback that effectively communicates differences in received signal strength between positioning steps and in determining the antenna position corresponding to the peak of the received signal strength once the antenna has been swept past the peak. In addition, even if successfully aligned during installation, changes in antenna position over time may result in degraded performance. Causes of changed in positioning direction may include, for example, a weakening of a support structure (e.g., a sagging building), a slipping of a wall mount, an impact to the antenna (e.g., a ball striking the antenna), or an obstruction between the antenna and the target (e.g., foliage growing or a new building). It may be difficult after an installation to determine whether performance degradation is due to mispointing of the antenna or to some other cause. To determine the cause of degraded performance, a technician may have to be sent out to the site location of the antenna, increasing costs of the system.

In addition, improving antenna alignment is becoming more important as bandwidth requirements increase. For example, misalignment may be compensated for by reducing a modulation and coding rate. However, to maintain a given data rate (e.g., bits-per-second (bps), etc.), this approach may increase system resource usage. As data rates increase, the effect on the system resources of misaligned antennas may be substantial.

SUMMARY

Methods, systems, and devices are described for improving accuracy and repeatability of alignment of an antenna. The antenna may include an accelerometer and a gyroscope that captures movement of the antenna. Accelerometer data may be used to sense movement in order to detect a movement time window corresponding to a movement event. The movement detection device may then analyze gyroscope data captured during the movement time window to determine a change in angular position of the antenna due to the movement event. During an installation process, the change in position determined from the accelerometer and gyroscope data may be used to provide feedback to direct an installer to position the antenna at an angular position corresponding to a peak signal strength for a signal transmitted from the antenna (e.g., satellite return link signal, etc.). For example, an alignment indication may be output when the angular position of the antenna is within a threshold distance of the angular position corresponding to the peak signal strength. In addition to assisting in achieving an initial good alignment, the accelerometer and gyroscope sensor data may also be used to detect, among other things, drift in the position of the antenna, an impact to the antenna, wind, and earthquakes.

In a first set of illustrative examples, a method for determining movement of an antenna is described. In one configuration, the method includes receiving accelerometer data for a first time period from an accelerometer mounted on the antenna and analyzing the accelerometer data to determine a movement time window for a movement event of the antenna. The method also includes receiving gyroscope data for the first time period from a gyroscope mounted on the antenna and analyzing the gyroscope data during the movement time window to determine an amount of movement of the antenna due to the movement event.

In another example, the antenna moves over a plurality of angular positioning steps during the first time period, wherein each of the plurality of angular positioning steps comprises an angular adjustment phase and a static phase. In some examples, analyzing to determine the movement time window further includes determining an angular positioning time window corresponding to the each of the plurality of angular positioning steps based on the accelerometer data. Analyzing accelerometer data to determine the amount of movement of the antenna may also include determining an amount of angular movement corresponding to the each of the plurality of angular positioning steps based on the gyroscope data within each respective angular positioning time window.

Some examples of the method include communicating a radio frequency signal via the antenna, identifying an amount of adjustment for aligning the antenna from a current angular position to an aligned angular position based at least in part on signal strength information of the radio frequency signal and the determined amount of angular movement of the antenna for one or more of the plurality of angular positioning steps, and providing an adjustment signal indicating the amount of adjustment to align the antenna. Identifying the amount of adjustment may also include determining that a peak return link signal strength corresponds to an angular position between a current angular positioning step and a previous angular positioning step. In some examples, the radio frequency signal is a transmit signal transmitted via the antenna and the method includes aligning the antenna to a received signal prior to the plurality of angular positioning steps.

Identifying the amount of adjustment may in some examples include calculating the angular position corresponding to the peak return link signal strength based on the return link signal strength information for the current angular positioning step and the previous angular positioning step and the determined amount of angular movement of the antenna between the current angular positioning step and the previous angular positioning step.

In another example of the method, providing the signal used to indicate the amount of adjustment for aligning the return link of the antenna includes providing one or more signals to use as a visual position reference of the antenna on a device external to the antenna.

Analyzing the accelerometer data to determine the movement time window may further include filtering the accelerometer data with a high-pass filter to obtain filtered accelerometer data and detecting a period of movement of the antenna by comparing the filtered accelerometer data to a threshold. In some examples, analyzing the accelerometer data to determine the movement time window also includes expanding the detected period of movement to obtain the movement time window. Some example methods may further include obtaining reference accelerometer data from the accelerometer during a reference time period, wherein the reference time period comprises a stationary period for the antenna prior to the first time period. An example method may include adapting at least one of the high-pass filter or the threshold based on the reference accelerometer data.

In some examples, analyzing the gyroscope data to determine the amount of movement of the antenna may further include estimating an idle state drift of the gyroscope data based on the gyroscope data outside the movement time window. Estimating the idle state drift of the gyroscope data may include calculating a sliding least squares estimate for the gyroscope data not within the movement time window. Such an example method may also include subtracting the idle state drift from the gyroscope data for the first time period to obtain drift-corrected gyroscope data. The method may also include integrating the drift-corrected gyroscope data over the movement time window to determine the amount of movement of the antenna.

In other examples, the method includes comparing the determined amount of movement of the antenna to an alignment threshold and transmitting an indicator of movement of the antenna if the determined amount of movement exceeds the alignment threshold. An example of the method may also include determining an orientation of an azimuth axis of the antenna and providing an indication of alignment of the determined orientation of the azimuth axis relative to a vertical axis.

In a second set of illustrative examples, an apparatus is described. In one configuration, the apparatus may include an antenna, an accelerometer mounted on the antenna, wherein the accelerometer produces accelerometer data, and a gyroscope mounted on the antenna, wherein the gyroscope produces gyroscope data. The apparatus may also include a movement detection device coupled with the accelerometer and the gyroscope, wherein the movement detection device receives the accelerometer data and the gyroscope data for a first time period, analyzes the accelerometer data to determine a movement time window for a movement event of the antenna, and analyzes the gyroscope data during the movement time window to determine an amount of movement of the antenna due to the movement event.

In some examples, the antenna moves over a plurality of angular positioning steps during the first time period, wherein each of the plurality of angular positioning steps comprises an angular adjustment phase and a static phase. The movement detection device may determine an angular positioning time window corresponding to the each of the plurality of angular positioning steps based on the accelerometer data and determine an amount of angular movement corresponding to the each of the plurality of angular positioning steps based on the gyroscope data within each respective angular positioning time window.

The apparatus may further include a communication device that communicates a radio frequency signal via the antenna when the antenna is in the static phase of the each of the plurality of angular positioning steps. The movement detection device may identify an amount of adjustment for aligning the antenna from a current angular position to an aligned angular position based at least in part on signal strength information of the radio frequency signal and the determined amount of angular movement of the antenna for one or more of the plurality of angular positioning steps. The movement detection device may also provide an adjustment signal indicating the amount of adjustment to align the antenna.

In other examples, the movement detection device determines that a peak return link signal strength corresponds to an angular position between a current angular positioning step and a previous angular positioning step. The movement detection device may calculate the angular position corresponding to the peak return link signal strength based on the return link signal strength information for the current angular positioning step and the previous angular positioning step and the determined amount of angular movement of the antenna between the current angular positioning step and the previous angular positioning step.

The movement detection device may provide one or more signals to use as a visual position reference of the antenna on a device external to the antenna. In other examples, the movement detection device may filter the accelerometer data with a high-pass filter to obtain filtered accelerometer data and detect a period of movement of the antenna by comparing the filtered accelerometer data to a threshold.

In some examples of the apparatus, the movement detection device expand the detected period of movement to obtain the movement time window. The movement detection device may obtain reference accelerometer data from the accelerometer during a reference time period, wherein the reference time period comprises a stationary period for the antenna prior to the first time period. The movement detection device may adapt at least one of the high-pass filter or the threshold based on the reference accelerometer data.

The movement detection device may, in some examples, estimate an idle state drift of the gyroscope data based on the gyroscope data outside the movement time window. The movement detection device may subtract the idle state drift from the gyroscope data for the first time period to obtain drift-corrected gyroscope data. The movement detection device may integrate the drift-corrected gyroscope data over the movement time window to determine the amount of movement of the antenna. In additional examples, the movement detection device may calculate a sliding least squares estimate for the gyroscope data not within the movement time window to obtain the estimated idle state drift of the gyroscope data.

In some examples of the apparatus, the movement detection device may compare the determined amount of movement of the antenna to an alignment threshold and transmit an indicator of movement of the antenna if the determined amount of movement exceeds the alignment threshold. The movement detection device may determine an orientation of an azimuth axis of the antenna and provide an indication of alignment of the determined orientation of the azimuth axis relative to a vertical axis.

In some examples, the movement detection device may be external to the antenna and is coupled with the accelerometer and the gyroscope via a wireless interface.

In a third set of illustrative examples, a satellite communication system is described. In one configuration, the satellite communication system may include a movement detection device configured to receive the accelerometer data and the gyroscope data for a first time period, analyze the accelerometer data to determine a movement time window for a movement event of the antenna, and analyze the gyroscope data during the movement time window to determine an amount of movement of the antenna due to the movement event.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
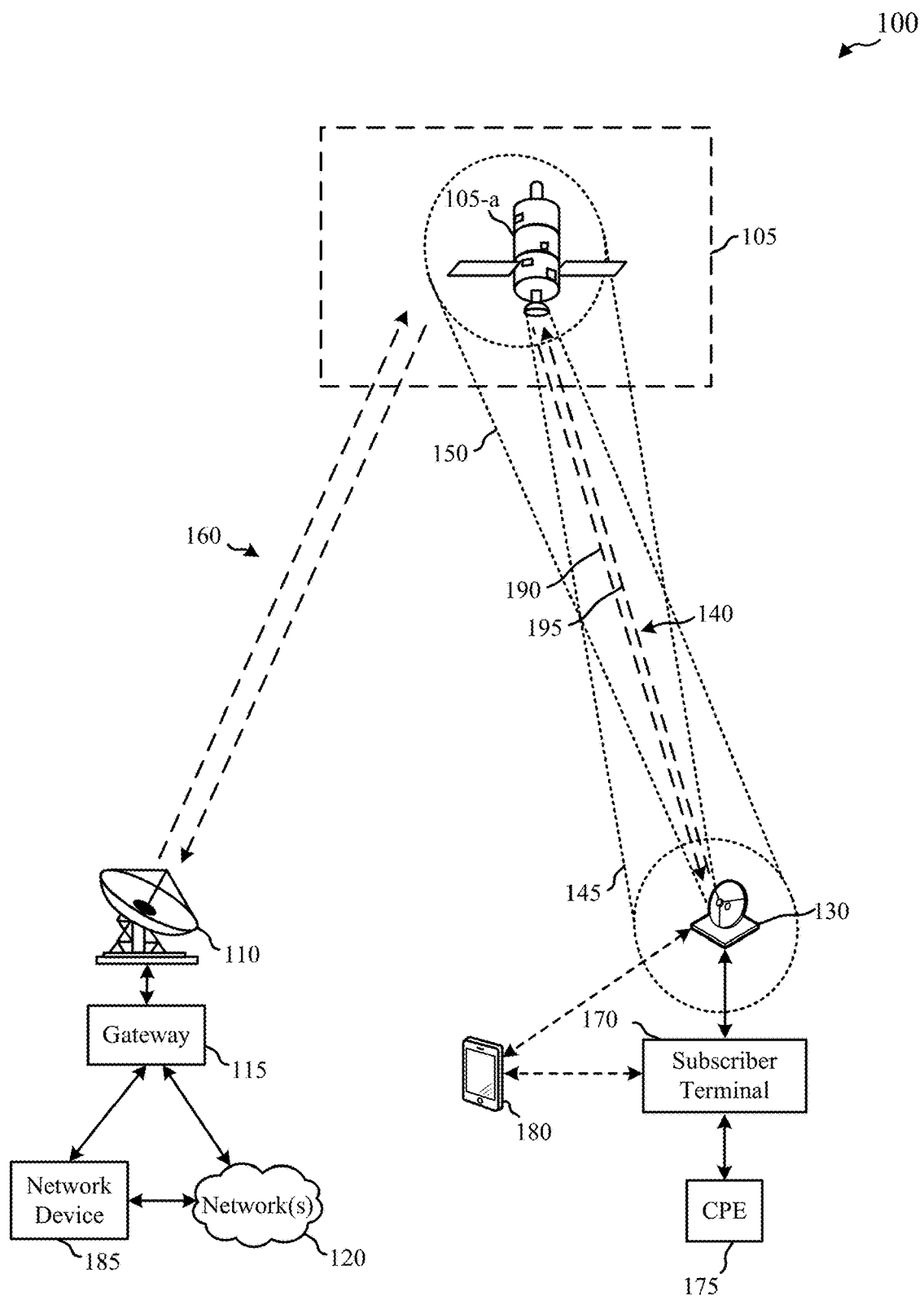
FIG. 1 shows a diagram of a satellite communication system in accordance with various aspects of the disclosure.

The described features generally relate to antenna positioning and techniques and devices used in a communication system for antenna alignment. The antenna may include an accelerometer and a gyroscope to capture data related to movement of the antenna. Some types of commercially available sensors may not have the inherent accuracy to provide detection of the small movements that are characteristic of antenna positioning and alignment. For example, lower cost accelerometers are generally accurate over longer periods of time, but may have noisy or inaccurate data when analyzed over shorter time windows. In contrast, the data output of a gyroscope may drift over time periods of seconds, minutes, etc., which may be enough to cause significant measurement errors in orientation.

Described embodiments detect movement events using the accelerometer data and determine a movement time window associated with a movement event that may be applied to the gyroscope data to determine angular movement of the antenna during the movement event. By looking only at the gyroscope data within the movement time window, errors due to gyroscope drift may be reduced. Most of the drift error that remains within the movement time window may be subtracted out using mathematical estimations such as a sliding least squares estimate. The processing of the accelerometer and gyroscope data as described herein may result in very accurate antenna alignments using low-cost sensor assemblies. Various techniques described herein may be used for aligning an antenna, detecting degradation of the performance of the antenna due to a position change (e.g., drift or sag of the antenna mount, an impact to the antenna, etc.) or for detecting certain events or conditions (e.g., high winds, earthquakes, etc.).

The methods, systems, and devices described herein may reduce the operational cost of installation and maintenance for antennas (e.g., satellite antennas, etc.) and improve resource efficiency of the communication system. For example, obtaining accurate antenna positioning information from accelerometer and gyroscope data may be used to rule out position of the antenna as the reason for poor signal performance. Further, accurate return link alignment may reduce the necessary resources for maintaining a given data rate by increasing the allowable coding rate (e.g., decreasing data redundancy), which may increase overall system performance.

This description provides examples, and is not intended to limit the scope, applicability or configuration of embodiments of the principles described herein. Rather, the ensuing description will provide those skilled in the art with an enabling description for implementing embodiments of the principles described herein. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

FIG. 1 shows a diagram of a satellite communication system 100 in accordance with various aspects of the disclosure. The satellite communication system 100 includes a satellite system 105, a gateway 115, a gateway antenna system 110, a satellite antenna 130, and a subscriber terminal 170. The gateway 115 communicates with one or more networks 120. A network device 185 may be coupled with the gateway 115 and may control aspects of the satellite communication system 100. The subscriber terminal 170 communicates with one or more customer premises equipment (CPE) devices 175. In operation, the satellite communication system 100 provides for two-way communications between the CPE devices 175 and the network 120 through the satellite system 105 and the gateway 115.

The satellite system 105 may include one or more satellites, such as a satellite 105-a. The one or more satellites in the satellite system 105 may include any suitable type of communication satellite. In some examples, some or all of the satellites may be in geostationary orbits. In other examples, any appropriate orbit (e.g., low earth orbit (LEO), etc.) for satellite system 105 may be used. Some or all of the satellites of satellite system 105 may be multi-beam satellites configured to provide service for multiple service beam coverage areas in a predefined geographical service area.

The gateway antenna system 110 may be two-way capable and designed with adequate transmit power and receive sensitivity to communicate reliably with the satellite system 105. The satellite system 105 may communicate with the gateway antenna system 110 by sending and receiving signals through one or more beams 160. The gateway 115 sends and receives signals to and from the satellite system 105 using the gateway antenna system 110. The gateway 115 is connected to the one or more networks 120. The networks 120 may include a local area network (LAN), metropolitan area network (MAN), wide area network (WAN), or any other suitable public or private network and may be connected to other communications networks such as the Internet, telephony networks (e.g., Public Switched Telephone Network (PSTN), etc.), and the like.

The satellite antenna 130 may be two-way capable and designed with adequate transmit power and receive sensitivity to communicate reliably with the satellite system 105. The satellite system 105 may communicate with the satellite antenna 130 by sending and receiving signals 140. The subscriber terminal 170 may send and receive signals to and from the satellite system 105 using the satellite antenna 130. The subscriber terminal 170 is connected to the one or more CPE devices 175 and may provide network access service or other communication services (e.g., broadcast media, etc.) to CPE devices 175 via the satellite system 105. The CPE devices 175 includes user devices such as, but not limited to, mobile phones, personal digital assistants (PDAs), other handheld devices, netbooks, notebook computers, tablet computers, laptops, display devices (e.g., TVs, computer monitors, etc.), printers, and the like. The CPE devices 175 may also include any equipment located at a premises of a subscriber, including routers, firewalls, switches, private branch exchanges (PBXs), Voice over Internet Protocol (VoIP) gateways, and the like.

The satellite communication system 100 may operate in one or more frequency bands. For example, satellite communication system 100 may operate in the International Telecommunications Union (ITU) Ku, K, or Ka-bands, C-band, X-band, S-band, L-band, and the like. Additionally, the satellite antenna 130 may be used in other applications besides ground-based stationary systems such as onboard boats, onboard aircraft, vehicles, and the like.

The satellite 105-a may emit one or more beams, such as beam 145 that is directed towards a beam coverage area that includes the satellite antenna 130. The satellite 105-a may be a multi-beam satellite and may have other beams covering other beam coverage areas. The satellite 105-a may transmit a forward link signal 190 via the beam 145 to the satellite antenna 130. In some examples, the satellite antenna 130 being aligned with the satellite 105-a may correspond to the satellite antenna 130 receiving the forward link signal 190 with at least a signal strength or signal-to-noise ratio (SNR) above a threshold, which may depend on the location of the satellite antenna 130.

The satellite antenna 130 may transmit a return link signal 195 via beam 150 to the satellite 105-a. In some examples, alignment of the satellite antenna 130 to the satellite 105-a may be considered optimal (e.g., acceptable or desired performance, etc.) when the return link signal 195 of the satellite antenna 130 is received at the target with signal strength or SNR above a threshold, which may also depend on the location of the satellite antenna 130. For example, the satellite antenna 130 may be considered to be properly aligned with a target (e.g., the satellite 105-a) when a main beam of the satellite antenna 130 has sufficient antenna gain in the direction of the target to permit signal communication having desired performance characteristics.

In some cases, proper alignment may be defined according to a beam gain contour about the maximum gain of the antenna for the forward link signal 190 or the return link signal 195. For example, aligning the direction of the target within the 1 dB or 3 dB beamwidth of the beam may be defined as providing acceptable or desired performance characteristics. In some cases, the beam gain contour may be relatively small and it may be difficult and/or time consuming to point the satellite antenna with the necessary precision by hand. In addition, alignment processes using adjustments made by an installer estimating positioning changes may not be consistently repeatable.

In embodiments, alignment processes for an antenna such as satellite antenna 130 may be enhanced using sensors mounted on the antenna. An inertial measurement sensor (referred to herein as an accelerometer) may be mounted on the satellite antenna 130 and may capture accelerometer data. The accelerometer data may reflect the satellite antenna 130 accelerating along at least one axis. A gyroscope sensor (referred to herein as a gyroscope) may be mounted on the satellite antenna 130 and may capture gyroscope data reflecting orientation or changes in orientation (e.g., angular movement, angular position, etc.) of the satellite antenna 130.

The sensors may be commercial off-the-shelf sensors and may be available at low cost for installation in high volumes. The sensors may also have relatively high noise and/or drift, and while good accuracy for large movements can be achieved by "multi-axis" filtering techniques, these techniques may not be effective at determining small amounts of movement and/or movement along only a single axis. Thus, existing techniques of filtering accelerometer and gyroscope data from low-cost sensors may not provide the desired accuracy for antenna alignment.

Described embodiments may use advantageous features of an accelerometer to compensate for disadvantages of a gyroscope. Accelerometer and gyroscope data may be captured by sensors on an antenna. The accelerometer may be used to monitor for movements of the antenna. From the accelerometer data, one or more movement events may be detected when the accelerometer data indicates accelerations above a threshold level. A movement time window corresponding to the time period of movement may be determined from the accelerometer data. The movement time window can be used to process gyroscope data to reduce the effects of long term drift of the gyroscope data. For example, embodiments described herein analyze the gyroscope data during the movement time window to get an accurate determination of the orientation of the antenna. The processed gyroscope data can indicate orientation of the antenna with higher precision for small movements or movements along one axis than current processing techniques.

Although examples described herein use a two-way antenna system for illustrative purposes, the techniques described herein are not limited to such satellite communication embodiments. For example, the sensors and techniques could be used on antennas for point-to-point terrestrial links and also may not be limited to two-way communication. In one embodiment, the sensors and techniques may be used for an initial installation in a receive-only implementation, such as broadcast television. The sensors and techniques may also be used for troubleshooting. For example, the sensor data may be stored locally at the terminal and a truck roll may only be performed after a customer indicates a poor signal and the installer remotely analyses the stored data.

Figure 2A:
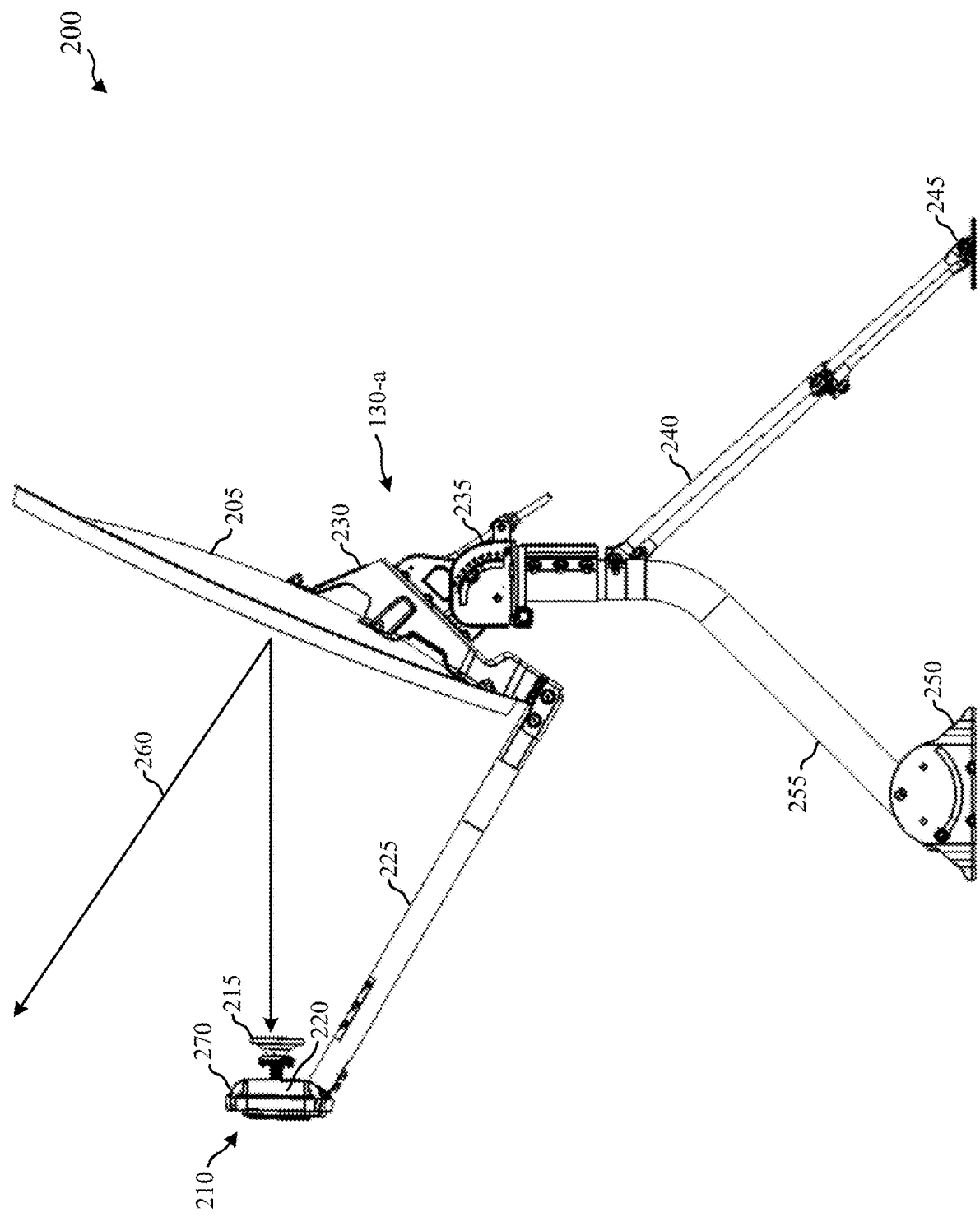
FIGS. 2A and 2B show views of a diagram of a satellite antenna in accordance with various aspects of the disclosure.

FIG. 2A shows a view of a diagram 200 of an example satellite antenna 130-a in accordance with various aspects of the disclosure. The satellite antenna 130-a may be an example of aspects of the satellite antenna 130 described with reference to FIG. 1. The satellite antenna 130-a has a mounting structure, which may be fixed to a structure or the ground, for example.

The satellite antenna 130-a includes a reflector 205 mounted to a mast 255 via a mounting bracket assembly 235. An antenna communication assembly 210 is attached to the reflector 205 via an arm 225 and a skew plate 230. The antenna communication assembly 210 may process signals transmitted by and/or received at the satellite antenna 130-a. In some examples, the antenna communication assembly 210 may be a transmit and receive integrated assembly (TRIA), which may be coupled with a subscriber terminal (e.g., subscriber terminal 170 of FIG. 1, etc.) via an electrical feed. The antenna communication assembly 210 includes a feed horn 215 and a transceiver. As illustrated, the antenna communication assembly 210 includes circuitry to support satellite communications assembled into a housing with the feed horn 215 opening towards the reflector 205. Electromagnetic signals, such as signals 140 of FIG. 1, may be transmitted by and received at the antenna communication assembly 210 via downlink and uplink beams. A boresight 260 may generally illustrate a principal axis (e.g., direction of maximum gain, etc.) of at least one of the downlink and uplink beams.

The mounting bracket assembly 235 may be of a conventional design and can include azimuth, elevation, and skew adjustments of the reflector 205 relative to the mast 255. Elevation refers to the angle between the antenna 130-a and the horizon, which may be measured with reference to the boresight 260. Azimuth refers to the angle between the boresight 260 and a direction of true north in a horizontal plane. Skew refers to the angle of rotation about the boresight 260.

The mounting bracket assembly 235 may include, for example, bolts that can be loosened to permit the satellite antenna 130-a to be separately moved in azimuth, elevation, and skew. After positioning the satellite antenna 130-a to the desired position in one of azimuth, elevation, and skew, the bolts for that portion of the mounting bracket assembly 235 can be tightened and other bolts loosened to permit a second adjustment to be made.

The mounting bracket assembly 235 may be installed on a top portion of the mast 255. On the other end, the mast 255 may attach to a mounting surface via a foot 250. The foot 250 may be, for example, a mounting bracket that can be used to affix the mast 255 to a structure. In some examples, the mast 255 is also supported by legs 240 that provide further attachment and stability using mounting brackets 245 to attach to the structure. One or more of the foot 250 and the mounting brackets 245 may function as an adjustable mounting device. The mast 255 may be installed and adjusted (e.g., using adjustments on legs 240) such that the top portion is plumb (i.e., relatively perpendicular to the horizon), allowing the elevation and azimuth of the reflector 205 to be adjusted independently via the mounting bracket assembly 235. The installer may then position the reflector 205 to the proper azimuth, elevation, and skew. As described in more detail below, the installer positions the satellite antenna 130-a to point the beam (e.g., boresight 260) at a target (e.g., a satellite). The installer may position the satellite antenna 130-a by moving the entire satellite antenna 130-a by hand. Alternatively, the satellite antenna 130-a may be positioned using motors or other automated mechanisms.

The satellite antenna 130-a may, for example, be initially pointed by the installer such that the boresight 260 is pointed in the general direction of the satellite. The initial azimuth, elevation, and skew angles for pointing the satellite antenna 130-a can be determined by the installer based on the known location of the satellite and the known geographic location where the satellite antenna 130-a is being installed. In the illustrated embodiment, the surface of the reflector 205 is non-parabolic and includes a major axis (the longest line through the center of the reflector 205) and a minor axis (the shortest line through the center of the reflector 205). The installer can adjust the skew angle of the satellite antenna 130-a until the major axis of the reflector is aligned with the geostationary arc.

Once the satellite antenna 130-a is coarsely positioned to the general directional coordinates of the first satellite, the elevation and/or azimuth angles can be further adjusted by the installer to fine tune the pointing until the satellite antenna 130-a is sufficiently pointed at the satellite group. The techniques for determining when the boresight 260 is sufficiently pointed at the satellite can differ between embodiments.

In one embodiment, the satellite antenna 130-a may be fine pointed using signal strength information for a signal received from the satellite, such as the forward downlink signal. Other criteria may also or alternatively be used to fine point the satellite antenna 130-a.

A measurement device, such as a power meter, may be used to directly measure the signal strength of the received signal. Alternatively, a measurement device may be used to measure some other metric indicating the signal strength of the received signal. The measurement device may for example be an external device that the installer temporarily attaches to the electrical feed. As another example, the measurement device may be integrated into the transceiver. In such a case, the measurement device may for example produce audible tones indicating signal strength to assist the installer in pointing the satellite antenna 130-a.

The installer can then iteratively adjust the elevation and/or azimuth angle of the satellite antenna 130-a until the received signal strength, as measured by the measurement device, reaches a predetermined value. In some embodiments, the installer adjusts the position of the satellite antenna 130-a until the received signal strength is maximized. In other words, the installer attempts to position satellite antenna 130-a such that the peak of the beam (e.g., boresight 260) is pointed directly at the satellite. Once the beam is sufficiently pointed at the satellite, the installer can immobilize the mounting bracket assembly 235 to preclude further movement of the satellite antenna 130-a. Installation and positioning processes that rely upon an installer to estimate positioning differences between different received signal strength values (e.g., between a current position and a peak position, etc.) may make such processes inconsistent or unreliable for accurate pointing.

The antenna communication assembly 210 may also include at least one sensor assembly 220. However, in other examples, the sensor assembly 220 may be located elsewhere on the satellite antenna 130-a. For example, the sensor assembly 220 may be located closer to the axes of rotation of the mount such as behind the reflector 205.

The sensor assembly 220 may include at least one accelerometer and at least one gyroscope. The accelerometer may be any type of sensor that detects rate of change of velocity or inertial movement. The gyroscope may be any type of sensor that can detect orientation or angular momentum. Further, the sensor assembly 220 can include any type of sensor that may be used to facilitate positioning or diagnostic monitoring of the satellite antenna 130-a. The accelerometer may be a micro-electro-mechanical system (MEMS) sensor. Similarly, the gyroscope may be a MEMS sensor. In some examples, the accelerometer and the gyroscope may be combined in a single MEMS sensor or sensor assembly. The combined MEMS sensor may be a 9-axis sensor (e.g., gyroscope, accelerometer, and magnetometer) or a 6-axis sensor (e.g., gyroscope and accelerometer). The sensors may be inexpensive sensors with relatively low inherent accuracy. Existing filtering techniques, which may be used for these types of sensors in detecting changes in orientation with approximate precision in the range of degrees for 3-axis movement, may not be effective for single axis or small movements. Further, the sensors may have different sampling rates and may be optimized for use in fast feedback applications such as aerial drones or wearable devices. Despite using these low accuracy sensors, which may have differing sampling rates, the systems and techniques described herein may be able to point an antenna with high precision (e.g., within a half of a degree or a tenth of a degree, in some cases).

The sensor assembly 220 may be oriented to a specific axis of the satellite antenna 130-a. The specific axis may be in line with an adjustment axis of the antenna. An adjustment axis may be an axis along which the satellite antenna 130-a moves when an azimuth or elevation knob is cranked (e.g., when an azimuth or elevation screw is adjusted). This means that when the satellite antenna 130-a is turned, the accelerometer and gyroscope will read movement in a single axis. Orienting the sensor assembly 220 in this way may result in the sensors detecting motion along the axis that are adjustable using the knobs. Lining up the sensor assembly 220 in this way may reduce processing complexity for sensor data over processing data along two or more axes. However, the sensor assembly 220 may be positioned on the satellite antenna 130-a in another way such that the sensor data is along two or more axes for single-axis movement of the satellite antenna 130-a. In some examples, the satellite antenna 130-a may be plumbed (e.g., positioned in line with a particular axis, such as vertical), such that moving a skew knob of the mounting bracket assembly 235 will only move the satellite antenna 130-a along a single axis. If the satellite antenna 130-a is not plumb, moving the skew knob or an elevation knob may move the satellite antenna 130-a along at least two axes. In some examples, the sensor data may be used to determine that the satellite antenna 130-a is not plumb during installation.

In examples other than the example of FIG. 2A, the satellite antenna 130-a may have a different mounting structure than that shown, such as, for example, a mounting structure suitable to mount on a pole. In examples where the satellite antenna 130-a is mounted on a moving object (e.g., a vehicle, aircraft, boat, etc.), or the target satellite is moving (e.g., LEO orbit, etc.) the satellite antenna 130-a may include one or more mechanical positioning elements (e.g., gimbal, etc.) to reposition the satellite antenna 130-a to track the target satellite. These positioning elements may be automatically controlled to reposition the satellite antenna 130-a as the object and/or satellite move relative to each other. Described embodiments are applicable to determining antenna position for mechanical positioning of antennas to a stationary target antenna (e.g., geostationary satellite, etc.) as well as for positioning antennas that track a moving target.

Figure 2B:
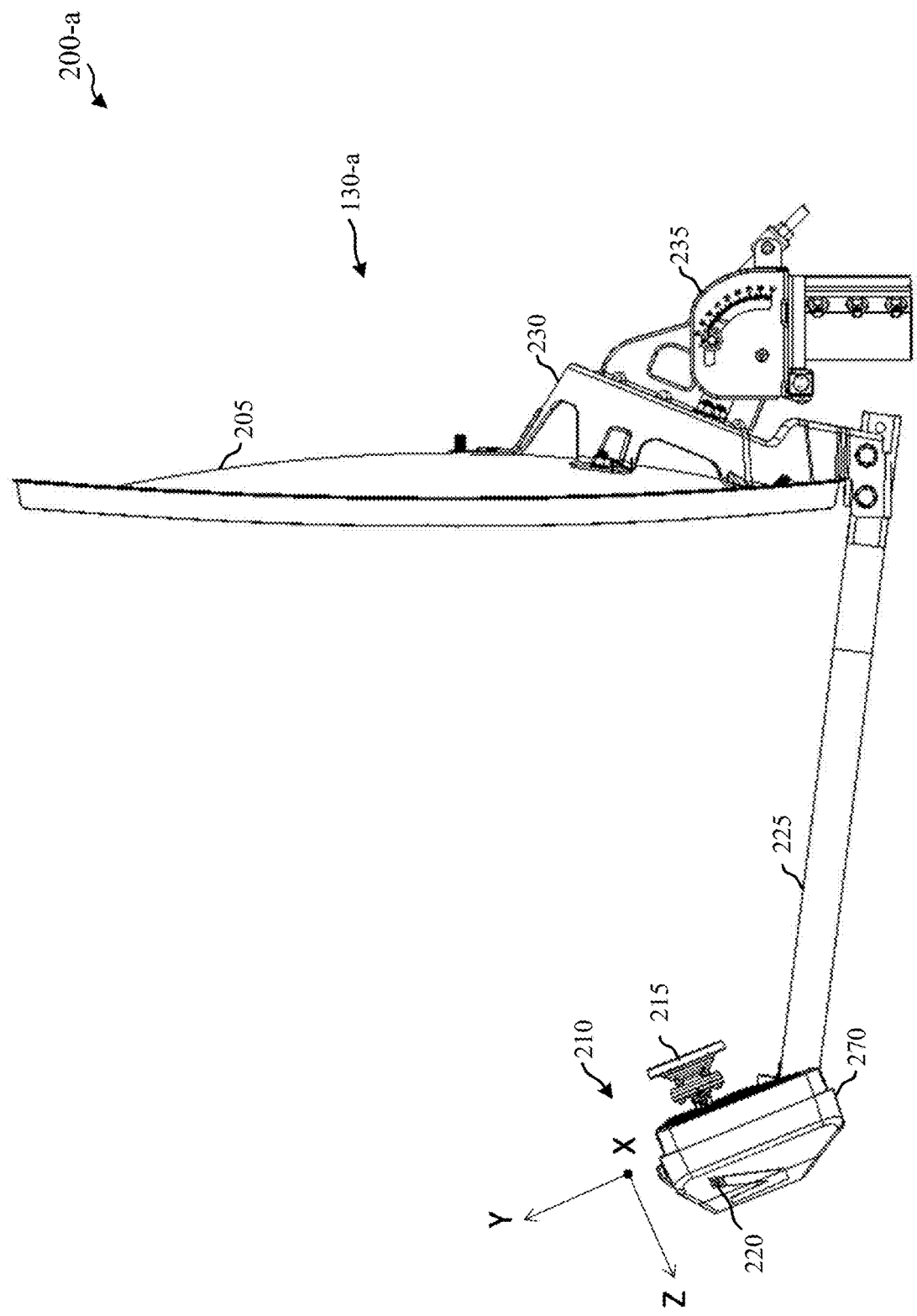

FIG. 2B shows an alternate view of a diagram 200-a of antenna communication assembly 210 in accordance with various aspects of the disclosure. The sensor assembly 220 may be installed on the inside of the housing 270 or may be installed in a separate housing on the outside of the housing 270. The sensor assembly 220 may include at least one 3-axis accelerometer and one 3-axis gyroscope sensor. In other examples, the sensor assembly 220 may include different numbers and types of sensors. In the satellite antenna 130-a, the sensor assembly 220 is oriented in the x-y plane as shown in FIG. 2B.

Figure 2C:
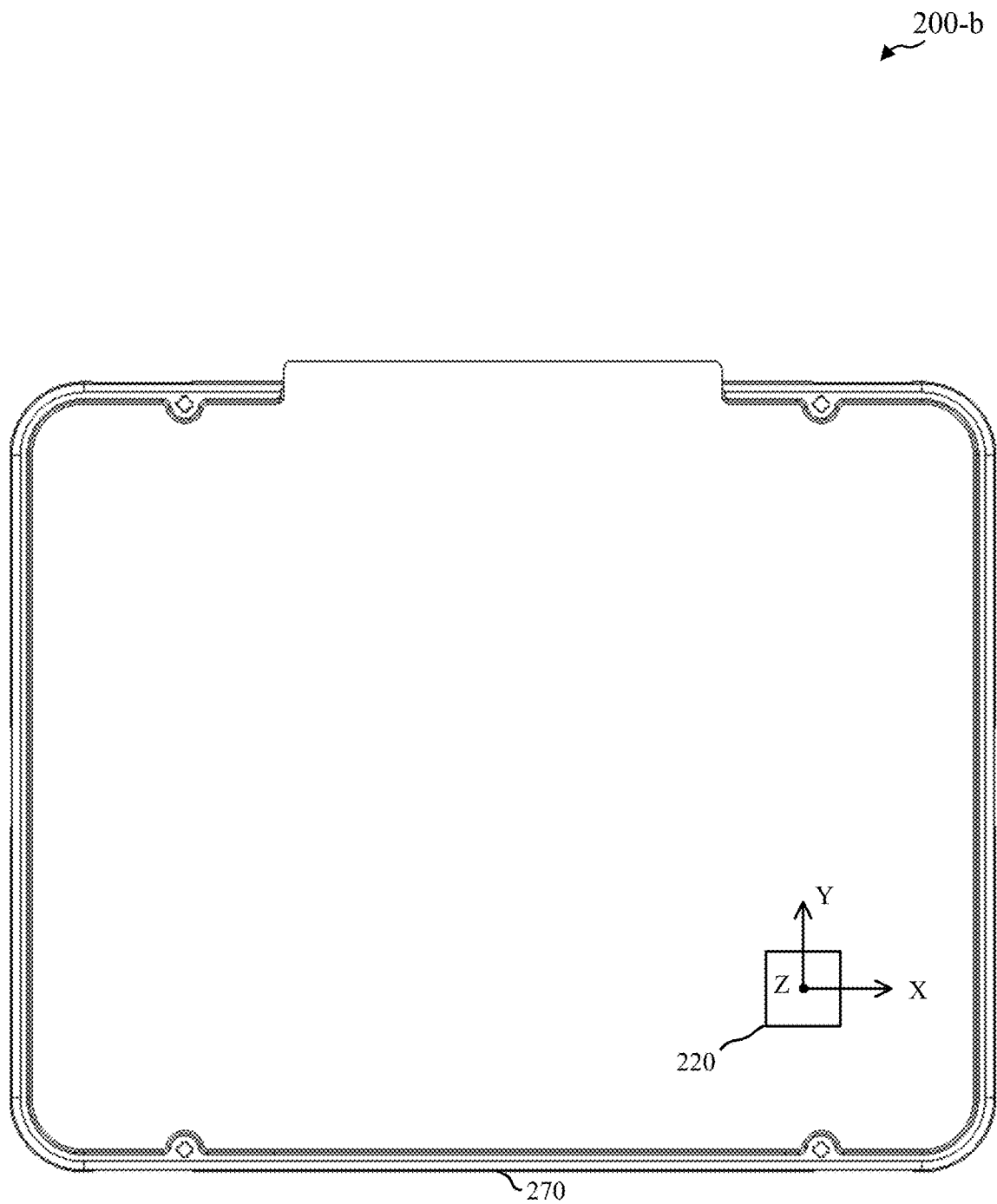
FIG. 2C shows a view of a diagram of a housing in a satellite antenna in accordance with various aspects of the disclosure.

FIG. 2C shows a front view of the housing 270 of the satellite antenna in accordance with various aspects of the disclosure. The sensor assembly 220 may be installed on a surface of the housing 270. In other examples, the sensor assembly 220 is installed within the housing 270 (e.g., on a printed circuit board (PCB), etc.). The sensor assembly 220 may be oriented such that at least one axis of the sensors (e.g., accelerometer and gyroscope) is coaxial or coplanar with at least one axis of the satellite antenna 130-a. For example, as shown in FIG. 2C, the sensor assembly 220 is oriented in the illustrated x-y plane such that an x-axis of the accelerometer and gyroscope lines up with the azimuth axis of the mounting bracket assembly 235.

While FIGS. 2A-2C illustrate sensor assembly 220 mounted within antenna communication assembly 210, the sensor assembly 220 may be located elsewhere on the satellite antenna 130-a. For example, the sensor assembly 220 may be located behind the reflector 205. This location may provide more accurate readings from the gyroscope because it brings the sensor assembly 220 closer to the axes of rotation of the reflector 205.

Figure 3:
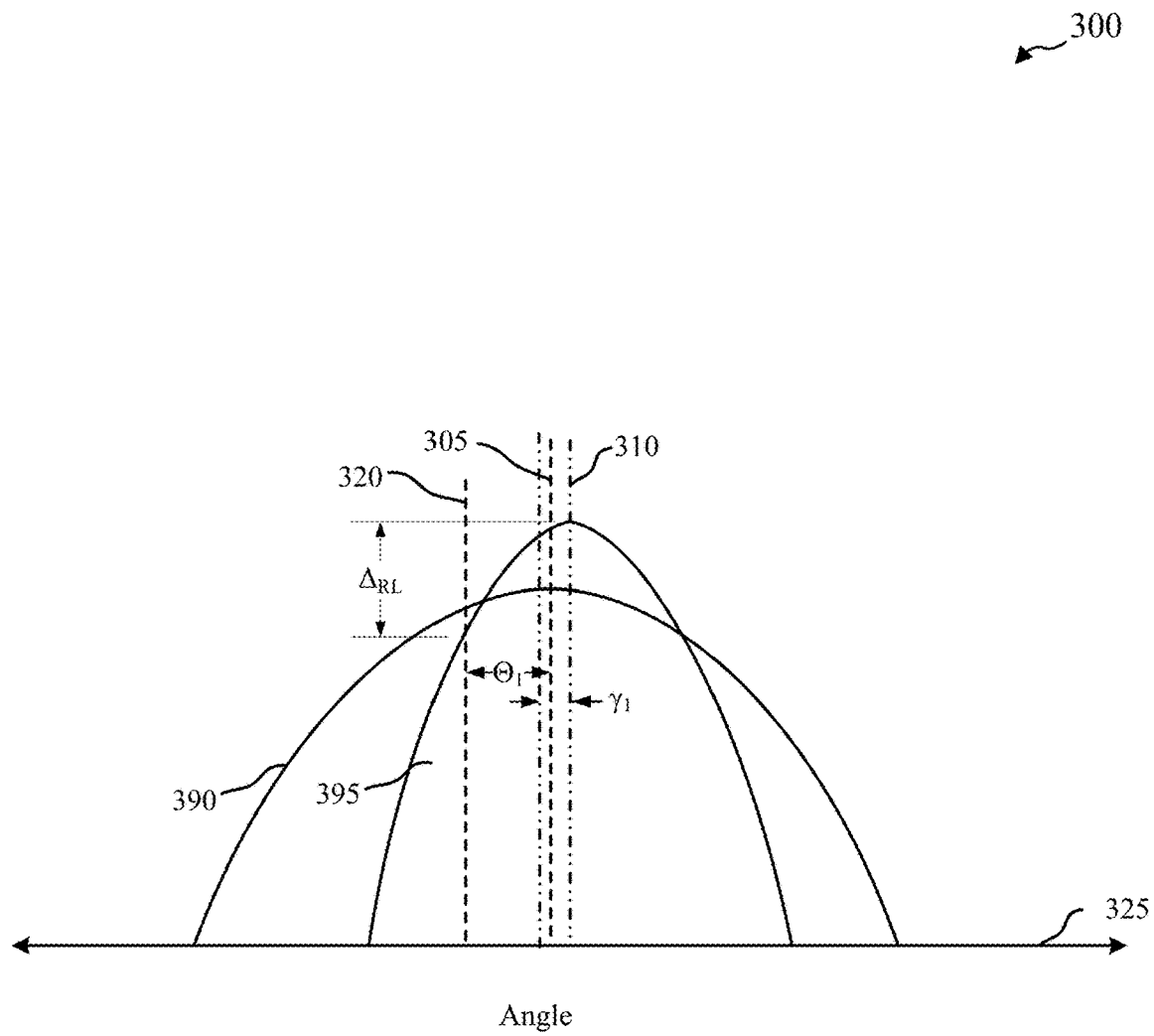
FIG. 3 shows a graph illustrating example radiation pattern versus angle in accordance with various aspects of the disclosure.

FIG. 3 shows a graph 300 illustrating example radiation patterns versus antenna angle in accordance with various aspects of the disclosure. An axis 325 represents an angle of an antenna (e.g., azimuth angle, etc.).

The graph 300 illustrates radiation pattern 390 for a forward link signal (e.g., forward link signal 190) received at the antenna. The graph 300 also illustrates radiation pattern 395 for a return link signal (e.g., return link signal 195) transmitted by the antenna and received by a target antenna. The radiation pattern 390 may have a broader beam than the radiation pattern 395. For example, if the forward link signal 190 is at a lower frequency than the return link signal 195, the antenna may be electrically larger at the higher frequency and therefore have more gain and a narrower beam. In addition, a peak 305 of the radiation pattern 390 corresponding to the direction of maximum received signal strength may not be co-incident with a peak 310 of the radiation pattern 395 corresponding to the direction of maximum transmitted signal strength, which may result from different signal waveforms or different polarization. The peaks 305, 310 may be offset from each other (e.g., due to the beam squint effect) because the antenna is offset fed and the two signals 190, 195 are circularly polarized. For example, the forward link signal may use right-hand circular polarization (RHCP) while the return link signal may use left-hand circular polarization (LHCP). However, even in examples with no beam squint, pointing on the return link signal 195 may still be more accurate where the beam of the radiation pattern 395 is narrower and thus more sensitive to angular changes.

As can be understood from FIG. 3, antenna alignments that may provide acceptable performance on the forward link may substantially degrade return link performance. For example, acceptable or desired forward link performance may be given within an angular range $\vartheta_1$ (e.g., corresponding to a 3 dB beam contour, etc.) between the peak of the radiation pattern 390 and the direction of the target (e.g. satellite 105-a). An acceptable or desired return link performance may be given within an angular range $\gamma_1$ between the peak 310 of the radiation pattern 395 and the direction of the target. For example, if the direction of the target were to be at angular position 320, the forward link performance would be acceptable. However, the return link performance would be degraded from the peak 310 by a large amount shown by $\Delta_{RL}$. Because the peaks 305, 310 may be offset and the angular range $\vartheta_1$ for the forward link may be a different width than the angular range $\gamma_1$ for the return link, an antenna aligned using only the forward link signal may severely degrade performance of the return link signal. In contrast, if the alignment is performed for optimal or desired performance of the return link, the forward link performance may not be significantly reduced.

Figure 4:
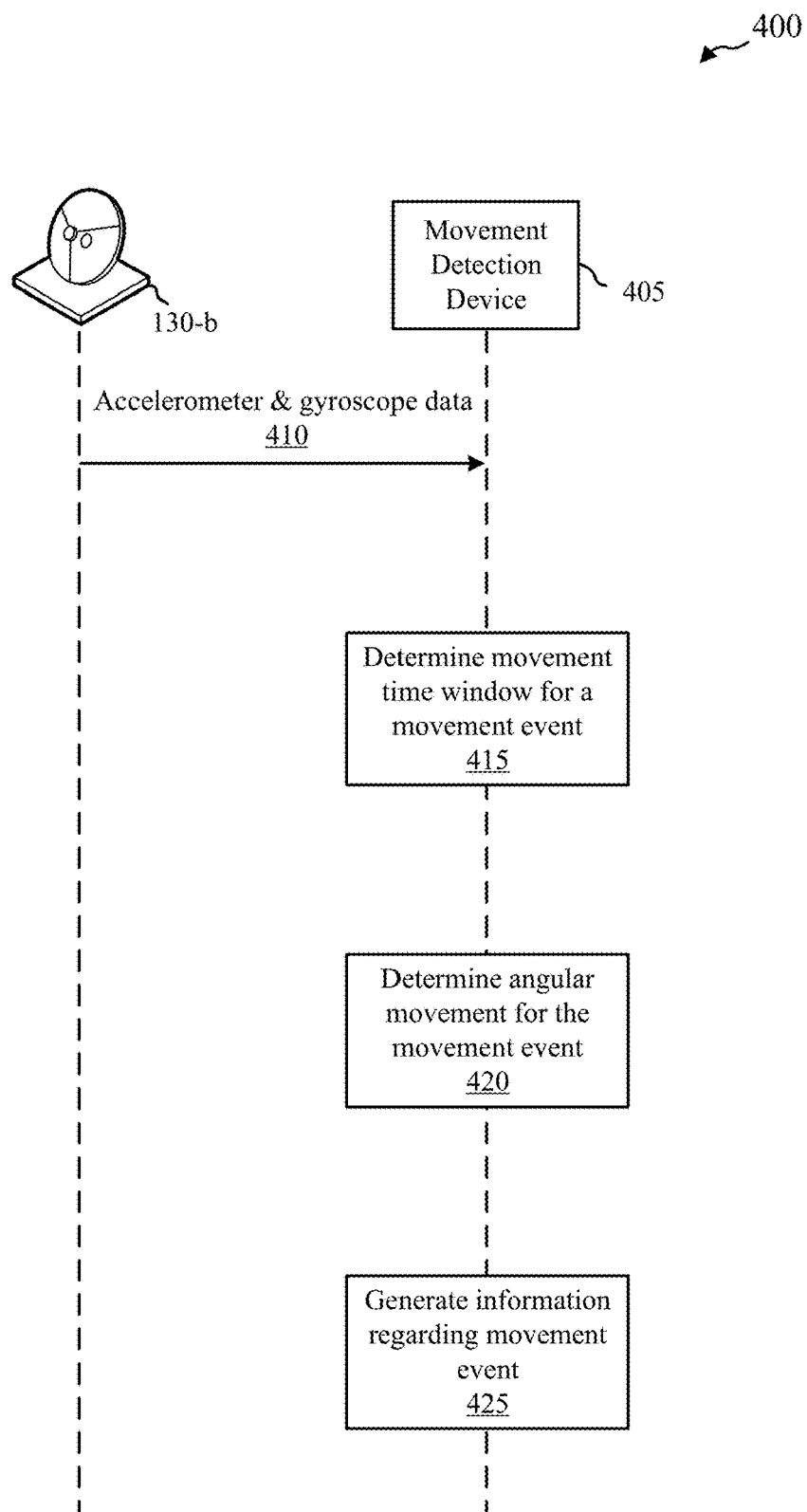
FIG. 4 is a flow diagram illustrating a process of detecting a movement event in accordance with various aspects of the disclosure.

FIG. 4 is a flow diagram illustrating a process 400 of detecting a movement event in accordance with various aspects of the disclosure. The process 400 includes communication between an antenna 130-b and a movement detection device 405. The antenna 130-b may be an example of aspects of the satellite antennas 130 described with reference to FIG. 1, 2A, or 2B.

The movement detection device 405 may process sensor data to determine movement of the antenna 130-b, may provide feedback regarding positioning of the antenna 130-b, and may issue indications of alignment, misalignment, or potential misalignment of the antenna 130-b, among other features. The movement detection device 405 may be part of the antenna 130-b (e.g., located in antenna communication assembly 210, etc.) or located externally to the antenna 130-b. In other examples, different components or features of the movement detection device 405 may be located in different devices. For example, part of the movement detection device 405 (e.g., data storage) may be located in an antenna communication assembly 210 of the antenna 130-b while another part is located in the subscriber terminal 170 (e.g., a processor that analyzes the sensor data), and a third part is located in the mobile device 180 (e.g., providing a visual display or auditory information regarding position of the antenna 130-b). However, for the purposes of discussing FIG. 4, as well as FIG. 5A below, the movement detection device 405 is illustrated as a device separate from the antenna 130-b.

The process 400 illustrates an example where the movement detection device 405 detects a movement of the antenna 130-b. The process 400 may occur after an initial alignment of the antenna 130-b or during an alignment process, for example. In other examples, the process 400 may be employed in monitoring the position of the antenna 130-b. The antenna 130-b may experience a movement event such as an impact to the antenna 130-b (e.g., hit with a ball), strong winds, an earthquake, or an adjustment of the antenna mount, for example.

The antenna 130-b may continuously or periodically capture accelerometer data and gyroscope data 410 (e.g., from sensors on the antenna 130-b) and forward it to the movement detection device 405. The movement detection device 405 may process the accelerometer and gyroscope data 410 to determine a movement time window for a movement event (415). The movement time window may correspond to a period of time where the acceleration of the antenna 130-b is above a threshold acceleration level.

The movement detection device 405 may determine an angular movement of the antenna 130-b for the movement event (420). The angular movement may be a calculation of how much and along what axes the antenna 130-b moved during the movement time window. In some examples, the angular movement may be in two or more axes, particularly if the antenna 130-b suffered an impact.

The movement detection device 405 may generate information regarding the movement event (425). The information may include, for example, an indication that the antenna 130-b is misaligned, an indication that the antenna 130-b has moved by the amount of determined angular movement, or positioning feedback for re-aligning the antenna 130-b. The movement detection device 405 may output the information regarding the movement event to one or more other associated components (e.g., subscriber terminal 170, mobile device 180, etc.).

Figure 5A:
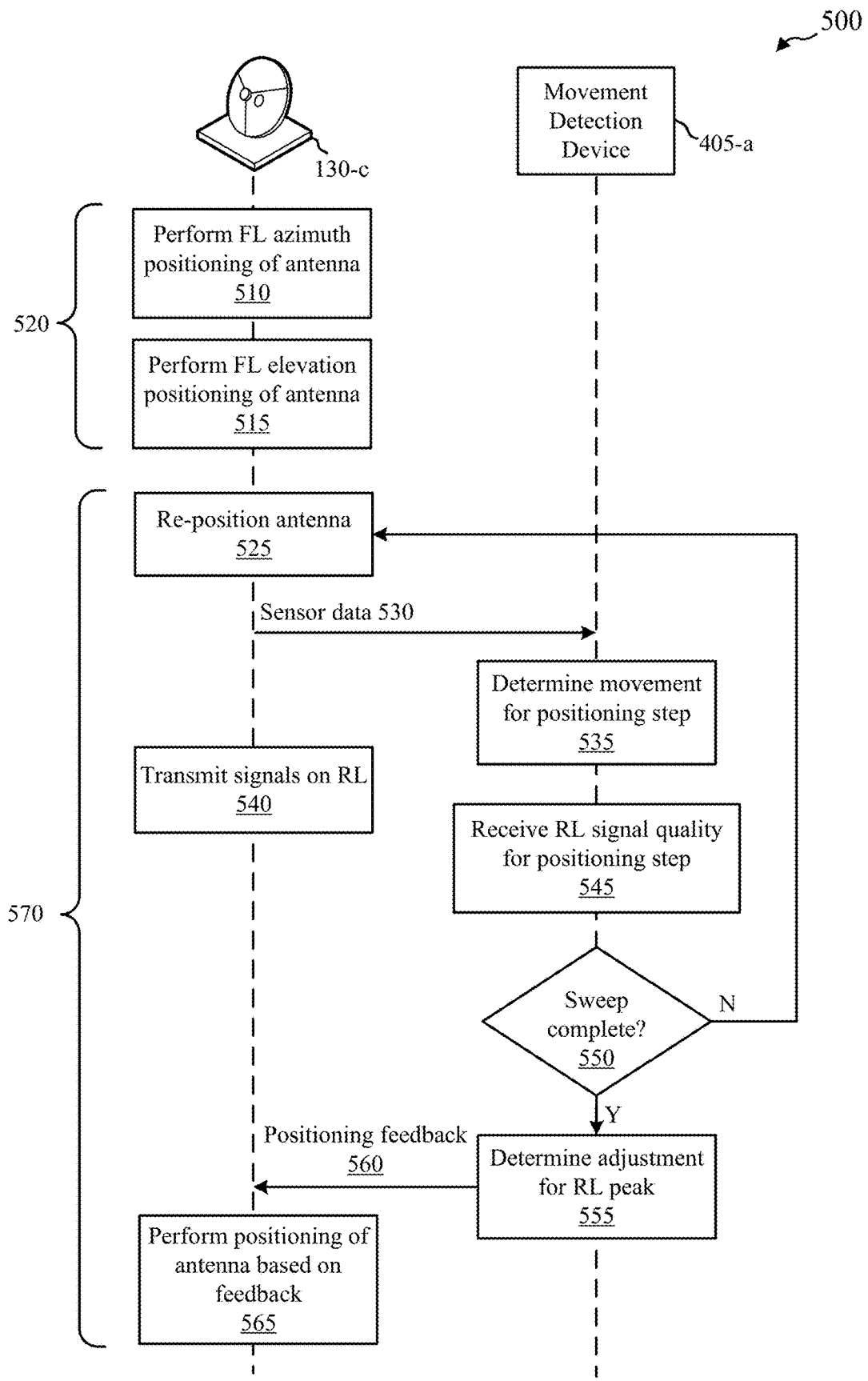
FIG. 5A is a flow diagram illustrating a process of aligning an antenna in accordance with various aspects of the disclosure.

FIG. 5A is a flow diagram illustrating a process 500 of aligning an antenna in accordance with various aspects of the disclosure. The process 500 includes positioning steps for antenna 130-c and communication between the antenna 130-c (e.g., sensors on the antenna 130-c) and a movement detection device 405-a. The antenna 130-c may be an example of aspects of the satellite antennas 130 described with reference to FIG. 1, 2A, 2B, or 4. The movement detection device 405-a may be an example of aspects of the movement detection device 405 described with reference to FIG. 4.

An initial positioning 520 of the satellite antenna 130-c may be performed. The initial positioning 520 may include confirming that a mounting structure of the antenna is plumb, performing a coarse pointing in the general direction of a target antenna, and positioning the antenna using forward link signals received at the antenna from the target antenna (e.g., satellite, etc.). For example, the initial positioning may include forward link peaking, which may involve aligning the antenna relative to peak or acceptable signal quality (e.g., strength, SNR, etc.) of a forward link signal (510). Next, an initial elevation positioning of the satellite antenna 130-c may be set by the installer (515), which may again involve forward link peaking. Additionally or alternatively, the elevation position may be aligned using a known latitude and predetermined satellite position data. The initial positioning may achieve acceptable or desired performance for signals received at the antenna 130-c over the forward link. The positioning in azimuth and elevation relative to forward link signal strength may be performed in any order. The initial positioning may be performed without transmitting signals from the antenna 130-c to the target antenna.

Once the initial positioning 520 of the antenna 130-c is complete, the antenna 130-c and/or other associated components (e.g., subscriber terminal 170, etc.) may be configured to transmit signals to the target antenna. For example, a modem for the antenna 130-c may be brought online in order to transmit using resources of the communication system for aligning the antenna 130-c using return link signals.

In embodiments, a second positioning process 570 may position the antenna using return link signals transmitted from the antenna 130-c to the target antenna. In some examples, the antenna 130-c may be swept in azimuth while transmitting the signals on the return link. The second positioning process may be performed by sweeping the antenna 130-c through a series of angular positioning steps and transmitting the return link signals. The movement detection device 405-a may use positioning information determined from the accelerometer and gyroscope and signal strength or beam gain information related to the transmitted return link signals for each of the steps. The movement detection device 405-a may match the angular positioning information for each step to the corresponding return link signal strength or quality information to perform return link peaking (e.g., determine the angular position corresponding to a highest signal strength or beam gain, etc.). Knowing the angular difference between a current position (e.g., if past the peak position) and the position corresponding to the peak of the return link signal may allow the movement detection device 405-a to output information that instructs an installer how to return the antenna 130-c to the angular position of the return link peak.

Figure 5B:
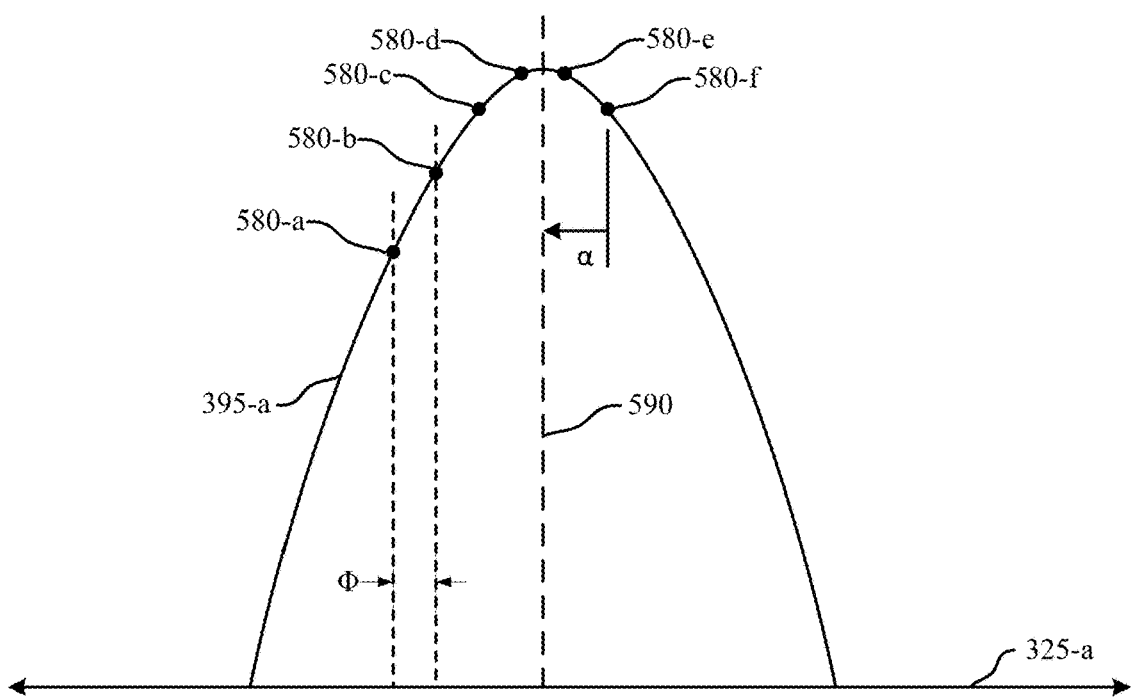
FIG. 5B is a diagram of example radiation pattern versus angle in an axis for a return link signal in accordance with various aspects of the disclosure.

Turning to FIG. 5B, a diagram 500-a of example radiation pattern 395-a vs. angle in axis 325-a for a return link signal (e.g., return link signal 195) transmitted by the antenna 130-c and received by a target antenna is shown in accordance with various aspects of the disclosure. For example, the diagram 500-a may illustrate the radiation pattern 395-a at different angular positions 580 between the peak 590 and the direction of the target antenna during the sweeping of the antenna 130-c in azimuth performed in positioning process 570 of FIG. 5A. The following discussion of positioning the antenna 130-c shown in FIG. 5A refers often to the graph shown in FIG. 5B. The graph in FIG. 5B represents a simplified example of signal strength or beam gain for the return link signal for clarity. In other examples, the signal strength or beam gain may result in different graphs with, for example, different characteristics or locations of the angular positions 580 relative to the radiation pattern 395-a.

The second positioning process 570 may include a sweep in angular position that includes a number of steps, where for each step the antenna 130-c is re-positioned (525) by a predetermined or variable increment (e.g., by turning an adjustment knob by a given amount, etc.). The satellite antenna 130-c may capture accelerometer data and gyroscope data and the movement detection device 405-a may receive the accelerometer and gyroscope data as sensor data 530. The movement detection device 405-a may determine an amount of movement for the positioning step (535) based on the sensor data 530. To determine the amount of movement, movement detection device 405-a may use the techniques described in more detail below including analyzing the accelerometer data to determine a movement time window for the positioning step and analyzing the gyroscope data during the movement time window to determine the amount of movement corresponding to the step (shown between angular positions 580-a and 580-b as Φ). These techniques are described in more detail with reference to FIGS. 7 and 8.

During the positioning process 570, the antenna 130-c may transmit signals on the return link (540) and the movement detection device 405-a may receive information related to signal strength (e.g., signal strength, SNR, etc.) for the return link signals (545) received by the target antenna. The movement detection device 405-a may determine signal strength information for each positioning step by matching up time periods that the return link signals were transmitted to the positioning steps. The movement detection device 405-a may further process the signal strength information for each positioning step (e.g., averaging multiple measurements of signal strength or SNR, etc.).

The movement detection device 405-a may determine if the sweep is complete (550) by, for example, determining if the peak 590 has been passed in the sweep (e.g., decreasing signal strength, SNR, etc.). In some examples, the positioning process may call for confirmation that the sweep has reached and passed the peak 590 to be considered an acceptable installation. The movement detection device 405-a may verify that the satellite antenna 130-c moved past the peak in the installation process. In some examples, the movement detection device 405-a may output a verification signal that confirms that the installer actually moved the satellite antenna 130-c past the peak 590, which may be required before the installation process is allowed to proceed to the subsequent steps. For example, when the antenna 130-c is swept from angular position 580-a through angular positions 580-b, 580-c, and 580-d during three positioning steps, the movement detection device 405-a may determine that the antenna gain of the radiation pattern 395-a in the direction of the target antenna has been increasing with each positioning step. When the angular position between the peak 590 and the direction of the target antenna is moved from 580-d to 580-e, the movement detection device 405-a may not determine a significant change in radiation pattern 395-a. When the angular position is next moved from 580-e to 580-f, the movement detection device 405-a may determine that the antenna gain of the radiation pattern 395-a in the direction of the target antenna has decreased. Based on these changes in the radiation pattern 395-a, the movement detection device 405-a may determine that the peak 590 has been passed in the sweep.

If the movement detection device 405-a determines that the sweep is complete, the movement detection device 405-a may determine which angular position corresponds to the peak 590. The peak 590 may correspond to a previous angular positioning step in the sweep, or may be determined to be in-between steps, in some cases. For example, the movement detection device 405-a may calculate that the peak 590 of the radiation pattern 395-a is between angular positions 580-d and 580-e. Using the determined angular positioning data, the movement detection device 405-a may determine an adjustment for the azimuth positioning of the antenna to return the antenna 130-c to the angular position corresponding to the peak (555). For example, the movement detection device 405-a may determine an adjustment, α, for the azimuth positioning to return the antenna 130-c to the peak 590.

The movement detection device 405-a may compare angular position of the antenna 130-c corresponding to the peak 590 to a current angular position of the antenna 130-c. If the current angular position is further than a threshold distance from the peak 590, the movement detection device 405-a may provide positioning feedback 560 that indicates the re-positioning to align the peak 590 of the antenna 130-c to the direction of the target antenna. The positioning feedback may indicate a direction and a number of turns of the azimuth adjustment to move the antenna 130-c to the determined position. In some examples, the movement detection device 405-a provides the positioning feedback 560 to another device, such as a mobile device the installer is using during the alignment process. If a mobile device is used, for example, the mobile device may provide a visual representation of the positioning feedback 560 for use by the installer.

Based on the positioning feedback 560, the installer may reposition the antenna 130-c (565). The repositioning may be in an azimuth direction. In some examples, once the antenna 130-c is re-positioned, the movement detection device 405-a may compare the amount of actual movement in re-positioning (e.g., using the accelerometer and gyroscope data as described with reference to FIGS. 7 and 8, etc.) to the desired movement. If the antenna 130-c is not pointed to within a threshold of a desired position the first time the positioning feedback 560 is received, the movement detection device 405-a may calculate and output new positioning feedback. The installer may reposition the satellite antenna 130-c according to feedback until the satellite antenna 130-c is aligned within a threshold amount.

During the positioning process 570, the movement detection device 405-a may determine if a mounting structure for satellite antenna 130-c is plumb. The movement detection device 405-a may determine if the mounting structure for satellite antenna 130-c is plumb by monitoring output of a magnetometer, for example. In another example, the movement detection device 405-a may determine whether the mounting structure is plumb using the gyroscope and accelerometer data. For example, if movement is detected on an axis that the antenna 130-c is not expected to move in during a sweep of the azimuth, it may indicate that the mounting structure is not plumb.

Figure 6:
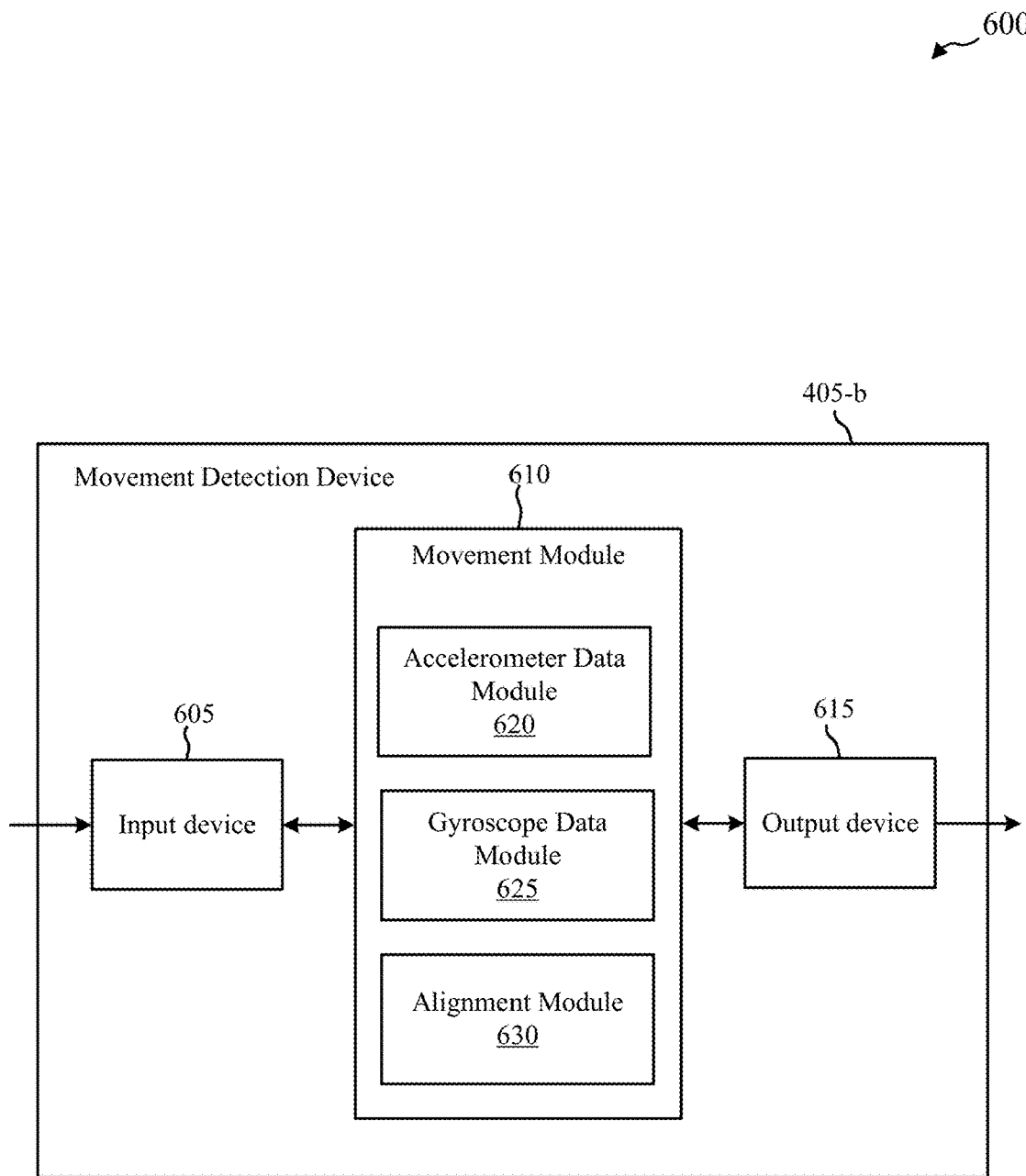
FIG. 6 shows a block diagram of a movement detection device in accordance with various aspects of the disclosure.

FIG. 6 shows a block diagram 600 of a movement detection device 405-b in accordance with various aspects of the disclosure. The movement detection device 405-b may be an example of aspects of a movement detection device 405 described with reference to FIGS. 4 and 5. The movement detection device 405-b may include an input device 605, a movement module 610, and an output device 615. The movement detection device 405-b may also be or include a processor. Each of these components may be in communication with each other.

The movement detection device 405-b, through the input device 605, the movement module 610, or the output device 615, may be configured to perform the functions described herein. For example, the movement detection device 405-b may be configured to determine a movement of a satellite antenna, issue a warning for a potential drift in position of the satellite antenna, assist with positioning the satellite antenna, and detect wind or earthquakes.

The input device 605 may receive information such as packets, user data, or control information associated with a satellite antenna, such as sensor data, signal quality data, or the like. In some examples, the input device 605 may be a wired input device that interfaces with another device, such as a subscriber terminal or the satellite antenna. In other examples, the input device 605 may be a receiver. The input device 605 may be configured to receive accelerometer and gyroscope data from the satellite antenna and return link antenna gain information from a gateway, for example. Information may be passed on to the movement module 610 and to other components of the movement detection device 405-b.

The movement module 610 may include an accelerometer data module 620, a gyroscope data module 625, and an alignment module 630. The movement module 610 may receive accelerometer data relating to the satellite antenna from the input device 605. The accelerometer data module 620 may process the accelerometer data to identify a movement time window. The movement time window may correspond to a time during movement of the satellite antenna. The accelerometer data module 620 may compare the accelerometer data to pre-defined signatures that correspond to different types of movement. In some examples, the movement detection device 405-b may include a data store that contains the pre-defined signatures. The accelerometer data module 620 may determine a type of movement experienced at the satellite antenna that corresponds to the accelerometer data. For example, the accelerometer data module 620 may determine that the accelerometer data corresponds to motion caused by wind. In another example, the accelerometer data module 620 determines that the accelerometer data corresponds to a single crank of an elevation adjustment device (e.g., knob).

The gyroscope data module 625 may analyze gyroscope data during the movement time window to determine an amount of movement of the antenna due to the movement event. The gyroscope data module 625 may determine how much angular movement the antenna had during the movement time window. For example, the gyroscope data module 625 may determine an angular positioning step from the gyroscope data corresponding to the movement time window.

The alignment module 630 may assist with an initial alignment of the antenna or a repositioning of the antenna. The alignment module 630 may process the angular positioning steps to determine which angular positioning step corresponds to a peak return link signal strength. The alignment module 630 may generate positioning feedback to help an installer move the antenna from a current position to an aligned position. The alignment module 630 may also generate an alignment indication when the antenna is aligned.

The alignment module 630 may also detect any change in position of the antenna that caused or is causing the antenna to be misaligned. For example, the alignment module 630 may determine, based on the analyzed sensor data, that the antenna experienced an impact causing it to point away from the target satellite. In another example, the alignment module 630 may determine that the antenna is moving back and forth with some periodicity, concluding that strong winds may be causing temporary poor signal quality. In some examples, the antenna may already be determined to be misaligned, but because it so far has not resulted in significant performance degradation, the antenna has not yet been repositioned. The alignment module 630 may determine when it may be likely that the performance of the antenna is significantly degraded to warrant action.

The output device 615 may output signals received from other components of the movement detection device 405-b.

The output device 615 may provide data to another component of a satellite communication system. In some examples, the output device 615 may be a wired output device that interfaces with another device, such as a subscriber terminal or the satellite antenna. In other examples, the output device 615 may be a transmitter. The output device 615 may output positioning feedback signals to indicate how to reposition the antenna. The output device 615 may also output a signal to indicate that the antenna is in good alignment. In some examples, the output device 615 may be collocated with the input device 605 into a single input/output (I/O) device, such as a transceiver.

Figure 7:
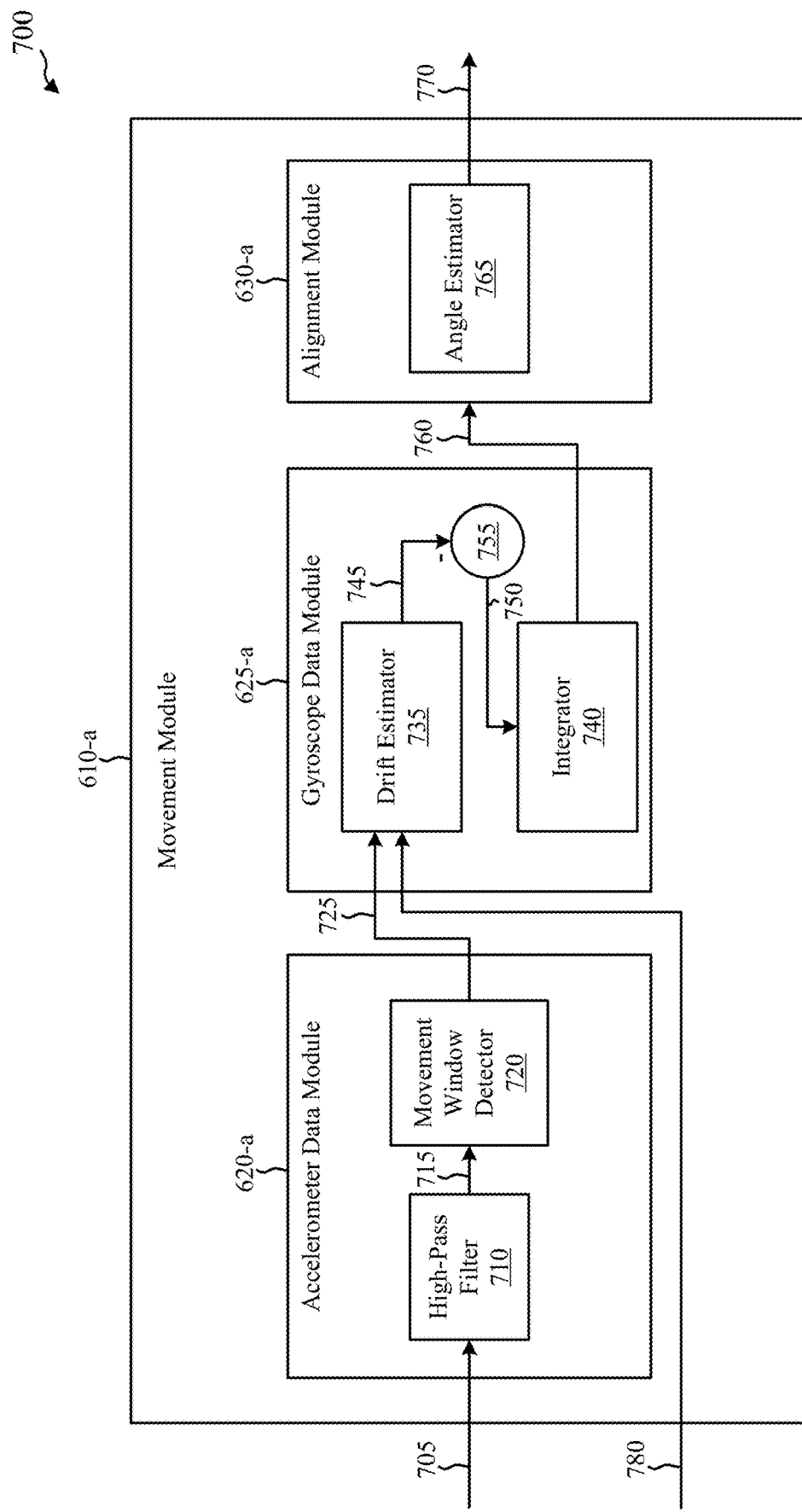
FIG. 7 shows a block diagram of a movement module in accordance with various aspects of the disclosure.

FIG. 7 shows a block diagram 700 of a movement module 610-a in accordance with various aspects of the disclosure. The movement module 610-a may be an example of aspects of the movement module 610 described with reference to FIG. 6. The movement module 610-a may include an accelerometer data module 620-a, a gyroscope data module 625-a, and an alignment module 630-a. The accelerometer data module 620-a, the gyroscope data module 625-a, and the alignment module 630-a may be an example of aspects of the accelerometer data module 620, the gyroscope data module 625, and the alignment module 630 described with reference to FIG. 6, respectively. The movement module 610-a may also be or include a processor. Each of these components may be in communication with each other.

Figure 8:
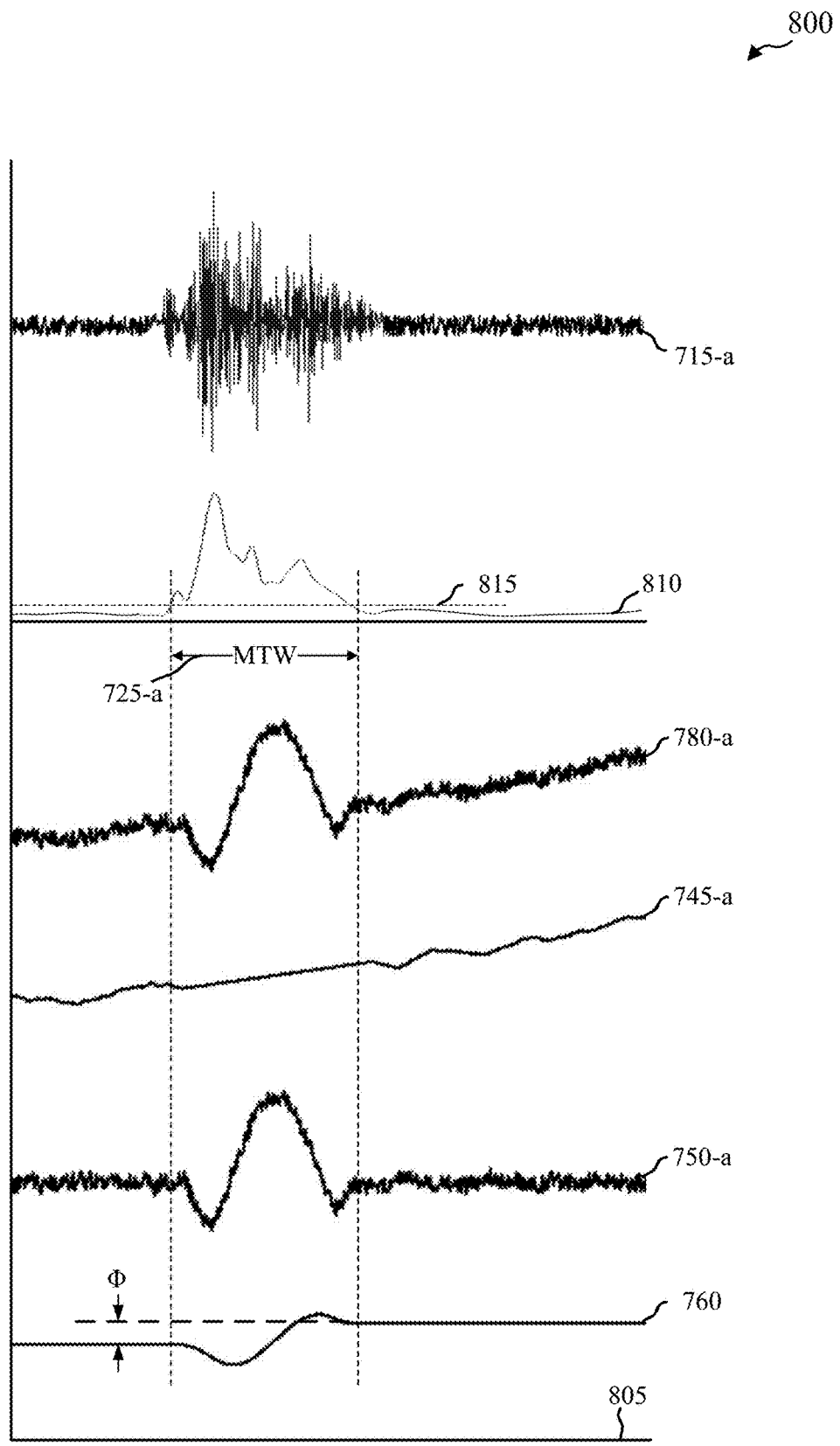
FIG. 8 shows a diagram of example sensor data in accordance with various aspects of the disclosure.

The accelerometer data module 620-a may receive accelerometer data 705 from an accelerometer mounted on an antenna. The accelerometer data may correspond to a time period including one or more movement events (e.g., alignment positioning steps, unintended movements, etc.). The accelerometer data module 620-a may analyze the accelerometer data 705 to determine movement time windows corresponding to the one or more movement events. Turning to FIG. 8, a diagram 800 of example sensor data is shown in accordance with various aspects of the disclosure. The diagram 800 includes several graphs illustrating sensor data at different stages of processing by the movement module 610-a with respect to time 805. The following discussion of sensor data processing shown in FIG. 7 refers often to the graphs shown in FIG. 8. The graphs in FIG. 8 represent a simplified example of sample accelerometer and gyroscope data for clarity. In other examples, the accelerometer and gyroscope data may result in different graphs with, for example, different noise or drift characteristics.

The accelerometer data module 620-a may include a high-pass filter 710 and a movement window detector 720. The high-pass filter 710 may be any suitable form of high-pass filter (e.g., finite impulse response (FIR), infinite impulse response (IIR), etc.). The high-pass filter may be used to separate out idle movements (e.g., slight swaying of the antenna in the wind) or spurious periodic ringing of the accelerometer data from actual movements such as the cranking of the azimuth adjustment, which may have higher frequency content and include ringing from multiple short movements separated by stopping or backlash of movement. The high-pass filter 710 may output filtered accelerometer data 715, which is illustrated in FIG. 8 as example filtered accelerometer data 715-a, and provide the filtered accelerometer data 715 to the movement window detector 720.

The movement window detector 720 may perform an envelope function (e.g., absolute value, filtering, etc.) of the filtered accelerometer data 715 to generate processed accelerometer data 810. The movement window detector 720 may determine a movement time window 725 by comparing the processed accelerometer data 810 to a threshold 815. For example, the movement time window 725-a for the movement event shown in FIG. 8 may be determined by windowing the processed accelerometer data 810 using a threshold 815. The threshold 815 may be selected such that any acceleration above the threshold 815 is likely to correspond to movement and anything below the threshold is likely to correspond to an idle state. In some examples, the movement window detector 720 may use threshold 815 to find movement time windows 725 having certain characteristics. For example, during antenna positioning, the movement window detector 720 may look for movement time windows 725 that are longer than a minimum length in time and/or less than a maximum length in time.

In some examples, the threshold 815 is static while in other examples, the threshold 815 dynamically changes based on one or more conditions such as a detected peak of the processed accelerometer data 810, idle conditions of the antenna or accelerometer data (e.g., sensor noise characteristics, etc.). A dynamically changing threshold may be more adaptable to conditions of the installation. For example, if there is a lot of wind during the installation, a dynamic threshold may compensate for the movement of the antenna due to wind.

Returning to FIG. 7, once the accelerometer data module 620-a has determined where the movement is within the accelerometer data, the movement time window 725 is provided to the gyroscope data module 625-a. Because it may be difficult to detect the exact time that the movement starts and stops, the movement time window 725 determined by applying the threshold 815 may be expanded in time (e.g., by a predetermined amount of time, dynamically based on threshold 815 or peak of accelerometer data 810 within movement time window 725-a, etc.) for use in further processing by the gyroscope data module 625-a.

The gyroscope data module 625-a may perform different processing steps based on gyroscope data 780 within the movement time window 725, and the gyroscope data 780 outside of the movement time window 725. The gyroscope data 780 is input into the drift estimator 735. The drift estimator 735 may determine a drift of the gyroscope data 780 over time. The drift estimator 735 outputs a moving average 745 of the gyroscope data 780 over a period of time (such as 1 second) during which no movement has been detected. Because the movement time window 725 during which the antenna was actually moving has been determined based on the accelerometer data, the drift can be understood as corresponding to gyroscope data output drift and not actual movement of the antenna. For example, a stationary gyroscope may produce gyroscope data that indicates movement of several degrees over the time span of minutes. As described above, the movement time window 725 may be expanded to ensure that gyroscope data corresponding to movement is not excluded in processing. Because of the expanded movement time window, gyroscope drift that is not corrected may produce substantial error. Once movement has been detected, a most recent value of the moving average 745 is subtracted from the gyroscope data 780 by a subtractor 755 to produce drift-corrected gyroscope data 750. As illustrated in FIG. 8, estimated moving drift 745-a is subtracted from gyroscope data 780-a to produce drift-corrected gyroscope data 750-a. The drift estimator 735 may use a data fitting algorithm, such as a sliding window least squares estimation.

The gyroscope data module 625-a further includes an integrator 740. The integrator 740 may receive the movement time window 725 and the drift-corrected gyroscope data 750 and integrate the drift-corrected gyroscope data 750 within the movement time window 725 to produce integrated gyroscope data 760 that represents the amount of angular movement within the movement time window 725.

The alignment module 630-a may include an angle estimator 765. The integrated gyroscope data 760 may be provided to the angle estimator 765. From the integrated gyroscope data 760, the angle estimator 765 may determine an angle 770 through which the antenna has been moved during the movement event.

As described above with respect to FIG. 4, the processing steps described with respect to FIG. 7 may be repeated several times (e.g., once for each angular positioning step) during an installation process. For example, the antenna may be swept through 10 different angular positions in 10 steps. The antenna may transmit a radio frequency signal during the positioning (e.g., for each of the 10 different positions, continuously, etc.). The movement module 610-a may estimate the angle for each of the 10 different angular positions. In conjunction with corresponding return link antenna gain information for the positioning steps, the movement module 610-a may determine an angular position that corresponded to the peak return link antenna gain. Based on that aligned angular position, the movement module 610-a may determine how much movement is needed to change the current position to the aligned position and provide positioning feedback to achieve the desired position.

In other examples, the process may be repeated more or less than 10 times, based on an initial angular position and the detection of a peak return link signal position. In some instances, it may be determined that the installer is adjusting the antenna in the wrong direction (e.g., no peak found, etc.), and feedback instructing the installer to change the sweep direction may be provided.

Figure 9:
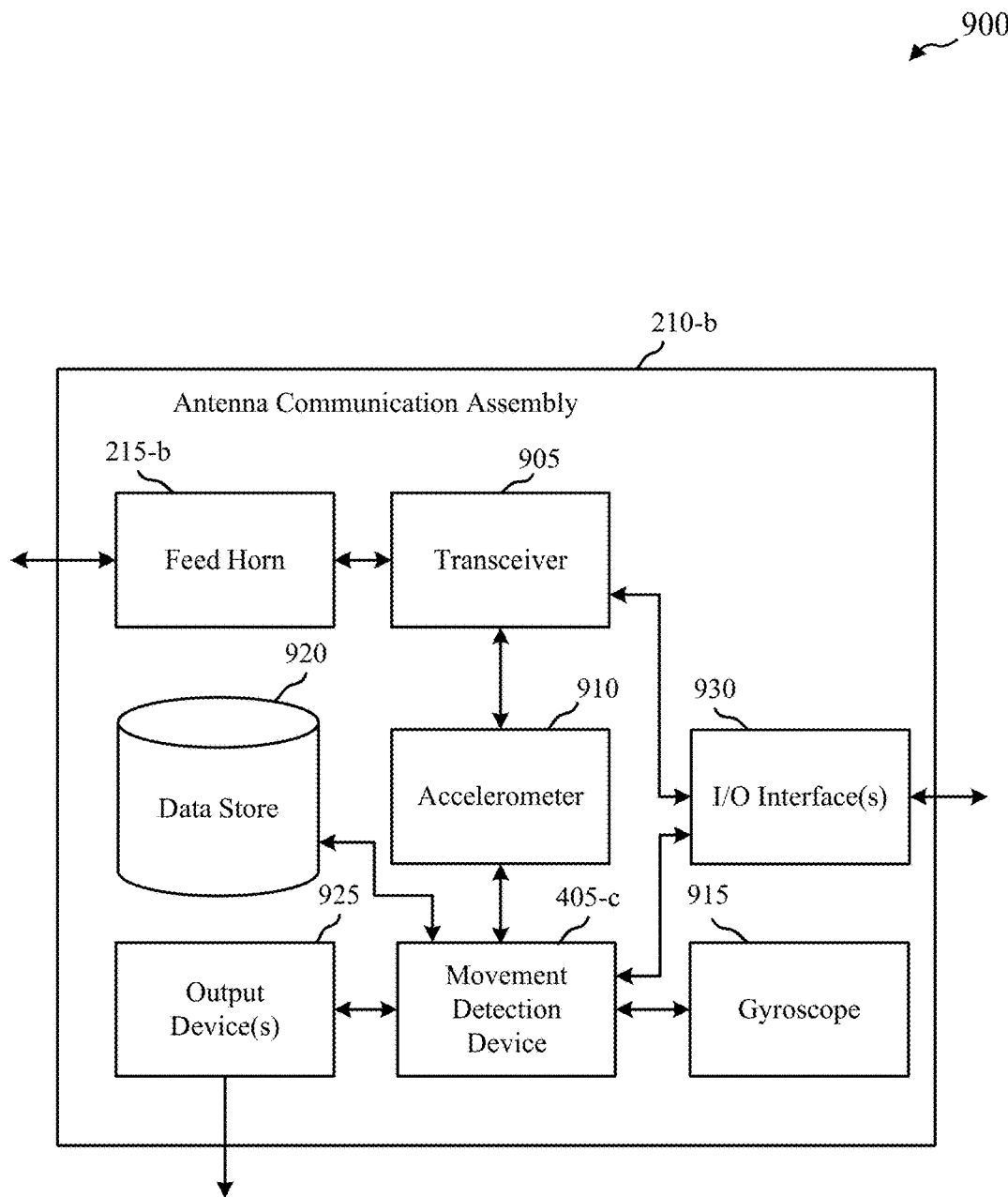
FIG. 9 shows a block diagram of an antenna communication assembly in accordance with various aspects of the disclosure.

FIG. 9 shows a block diagram 900 of an antenna communication assembly 210-b in accordance with various aspects of the disclosure. The antenna communication assembly 210-b may be an example of aspects of an antenna communication assembly 210 described with reference to FIGS. 2 and 3. The antenna communication assembly 210-b may include a feed horn 215-a, a transceiver 905, one or more accelerometers 910, one or more gyroscopes 915, a movement detection device 405-c, a data store 920, one or more I/O interfaces 930, and one or more output devices 925. Each of these components may be in communication with each other.

The antenna communication assembly 210-b may be configured to perform functions described herein. For example, the antenna communication assembly 210-b may be configured to provide accelerometer and gyroscope data, determine an angular position of the satellite antenna, detect a potential misalignment of the satellite antenna, assist with positioning the satellite antenna, supporting remote troubleshooting, and detecting wind or earthquakes. In one example, the antenna communication assembly 210-b may include movement detection device 405-c, which may implement the functionality of the movement detection devices 405 of FIG. 4, 5A, or 6. However, in other examples, the antenna communication assembly 210-b does not include functionality for analyzing the accelerometer and gyroscope data, which may be performed by a movement detection device 405 implemented in a device external to the antenna communication assembly 210-b (e.g., subscriber terminal 170, mobile device 180, network device 185, etc.).

The feed horn 215-a may be an example of one or more aspects of a feed horn 215 described with respect to FIG. 2A and is not discussed further here for brevity. The transceiver 905 may functions as a transceiver for communications to a satellite. In some examples, the transceiver 905 may be a communication device that communicates a radio frequency signal via the antenna (e.g., continuously, when the antenna is in a static phase of the each of the plurality of angular positioning steps, etc.).

The antenna communication assembly 210-b may include one or more accelerometers 910. The accelerometer 910 may be a MEMS sensor. The accelerometer 910 may continuously capture acceleration data for the satellite antenna. In other examples, the accelerometer 910 may capture data when directed. For example, the accelerometer 910 may capture sensor data during an installation, a repositioning, periodically, or when specifically requested.

The antenna communication assembly 210-b may include one or more gyroscopes 915. The gyroscope 915 may be a MEMS sensor. The gyroscope 915 may continuously capture gyroscope data (e.g., orientation data) for the satellite antenna. In other examples, the gyroscope 915 may capture data when directed. For example, the gyroscope 915 may capture sensor data during an installation, a repositioning, periodically, or when specifically requested. In some examples, the gyroscope 915 and the accelerometer 910 may be included in a single MEMS sensor. In some examples, the gyroscope 915 and the accelerometer 910 are included in a sensor board, such as the sensor assembly 220 of FIG. 2A.

The data store 920 may temporarily store the accelerometer data and gyroscope data. The data store 920 may also store pre-defined acceleration signatures (e.g., minimum movement time windows, movement time window to peak acceleration ratio, etc.) that correspond to different movements of the satellite antenna.

The I/O interface 930 may be coupled with a subscriber terminal or a CPE device. Through the I/O interface 930, the movement detection device 405-c may receive information on signal quality and performance of the satellite antenna, indications of an alignment process, or the like. The I/O interface 930 may be configured to send accelerometer and gyroscope data from the satellite antenna to connected components or devices. The I/O interface 930 may also be used to send signals received from other components of the antenna communication assembly 210-b to external devices, such as a network device or a mobile device. The I/O interface 930 may be used to send data to another component of the satellite communication system.

The output device 925 may output positioning feedback generated by the movement detection device 405-c to indicate how to move the satellite antenna to align it. The output device 925 may also output a signal to indicate that the satellite antenna is in good alignment. In another example, the output device 925 may also output a signal to indicate that the satellite antenna is misaligned.

The components of the movement detection device 405-b, the subscriber terminal 170-a, the network device 185-a, the mobile device 180-a, and the antenna communication assembly 210-b may, individually or collectively, be implemented using at least one application-specific integrated circuit (ASIC) adapted to perform some or all of the applicable functions in hardware. Alternatively, the functions may be performed by at least one other processing unit (or core), on integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each component may also be implemented, in whole or in part, with instructions embodied in a memory, formatted to be executed by general or application-specific processors.

Figure 10:
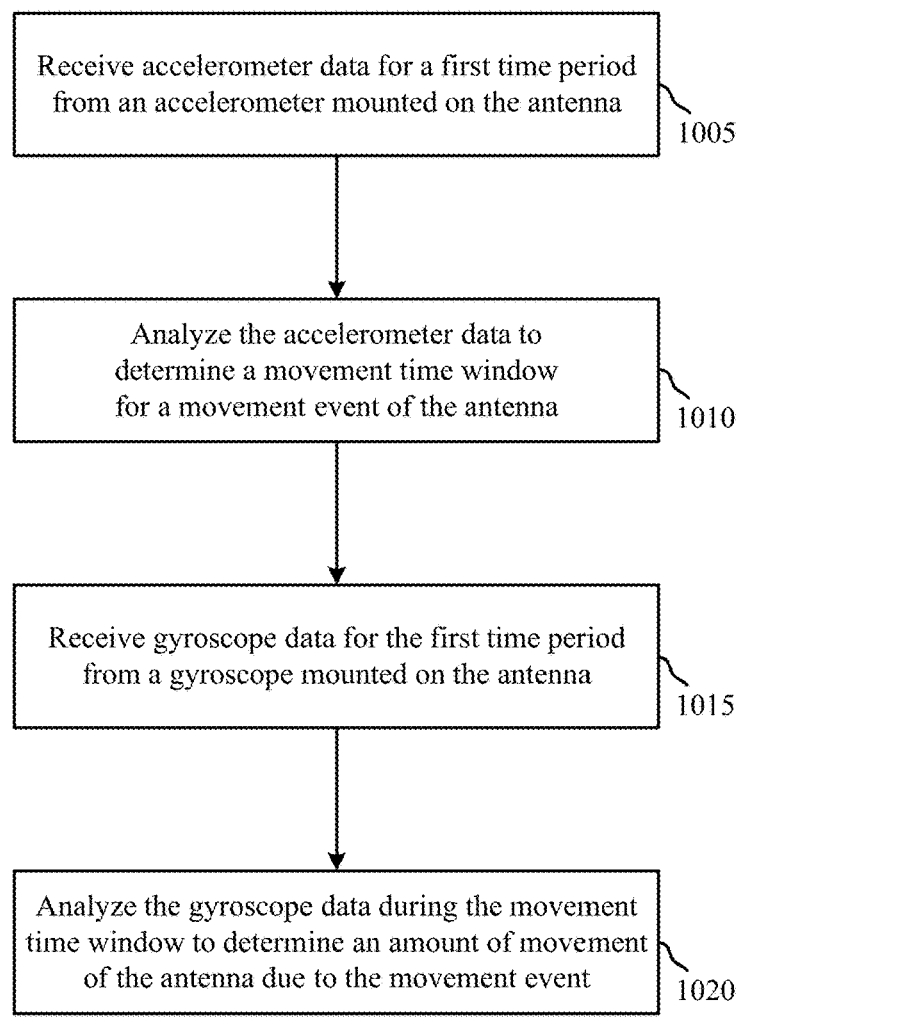
FIG. 10 is a flow chart illustrating an example of a method for determining movement of an antenna in accordance with various aspects of the disclosure.

FIG. 10 is a flow chart illustrating an example of a method 1000 for determining movement of an antenna in accordance with various aspects of the disclosure. For clarity, the method 1000 is described below with reference to aspects of the movement detection device 405 described with reference to FIG. 4, 5A, or 6. In some examples, the movement detection device may execute sets of codes to control the functional elements of the movement detection device to perform the functions described below. Additionally or alternatively, the movement detection device may perform of the functions described below using multi-purpose hardware. In various examples, the functionality of the movement detection device may be spread across multiple devices.

The method 1000 may include receiving accelerometer data for a first time period from an accelerometer mounted on the antenna (1005). The method 1000 may also include analyzing the accelerometer data to determine a movement time window for a movement event of the antenna (1010).

In some examples, analyzing the accelerometer data to determine the movement time window further includes filtering the accelerometer data with a high-pass filter to obtain filtered accelerometer data and detecting a period of movement of the antenna by comparing the filtered accelerometer data to a threshold. Analyzing the accelerometer data to determine the movement time window may further include expanding the detected period of movement to obtain the movement time window. Additionally, the method 1000 may include obtaining reference accelerometer data from the accelerometer during a reference time period, wherein the reference time period comprises a stationary period for the antenna prior to the first time period. The high-pass filter or the threshold may be adapted based on the reference accelerometer data.

Additionally, the method 1000 may further include receiving gyroscope data for the first time period from a gyroscope mounted on the antenna (1015). The method 1000 may also include analyzing the gyroscope data during the movement time window to determine an amount of movement of the antenna due to the movement event (1020).

In some examples, the antenna may move over a plurality of angular positioning steps during the first time period. Each of the plurality of angular positioning steps may include an angular adjustment phase and a static phase. The static phase may be an idle state, for example. In some examples, analyzing to determine the movement time window includes determining an angular positioning time window corresponding to the each of the plurality of angular positioning steps based on the accelerometer data. Analyzing to determine the amount of movement of the antenna may further include determining an amount of angular movement corresponding to the each of the plurality of angular positioning steps based on the gyroscope data within each respective angular positioning time window.

Some examples of the method 1000 include communicating a radio frequency signal via the antenna. The method 1000 may identify an amount of adjustment for moving the antenna from a current angular position to an aligned angular position based at least in part on antenna gain information of the radio frequency signal and the determined amount of angular movement of the antenna for one or more of the plurality of angular positioning steps. The method may further provide an adjustment signal indicating the amount of adjustment to move the antenna. Identifying the amount of adjustment may further include determining that a peak return link signal strength corresponds to an angular position between a current angular positioning step and a previous angular positioning step. In another example, identifying the amount of adjustment may further include calculating the angular position corresponding to the peak return link signal strength based on the return link signal strength information for the current angular positioning step and the previous angular positioning step and the determined amount of angular movement of the antenna between the current angular positioning step and the previous angular positioning step.

In some examples, providing the signal used to indicate the amount of adjustment for aligning the return link of the antenna may further include providing one or more signals to use as a visual position reference of the antenna on a device external to the antenna. The radio frequency signal may be a transmit signal transmitted via the antenna. Aligning the antenna may further include positioning the antenna to a received signal prior to the plurality of angular positioning steps.

Analyzing the gyroscope data to determine the amount of movement of the antenna may further include estimating an idle state drift of the gyroscope data based on the gyroscope data outside the movement time window. Analyzing the gyroscope data may also include subtracting the idle state drift from the gyroscope data for the first time period to obtain drift-corrected gyroscope data for the movement time window. Analyzing the gyroscope data may also include integrating the gyroscope data over the movement time window to determine the amount of movement of the antenna. In some examples, estimating the idle state drift of the gyroscope data includes calculating a sliding least squares estimate for the gyroscope data not within the movement time window.

Another example of the method 1000 includes comparing the determined amount of movement of the antenna to an alignment threshold and transmitting an indicator of movement of the antenna if the determined amount of movement exceeds the alignment threshold. Further examples of the method 1000 may include determining an orientation of an azimuth axis of the antenna and providing an indication of alignment of the determined orientation of the azimuth axis relative to a vertical axis.

The operation(s) at blocks 1005-1015 may be performed using the movement detection device described with reference to FIG. 4, 5A, or 6. Thus, the method 1000 may be for use in a satellite communication system. It should be noted that the method 1000 is just one implementation and that the operations of the method 1000 may be rearranged or otherwise modified such that other implementations are possible.

Figure 11:
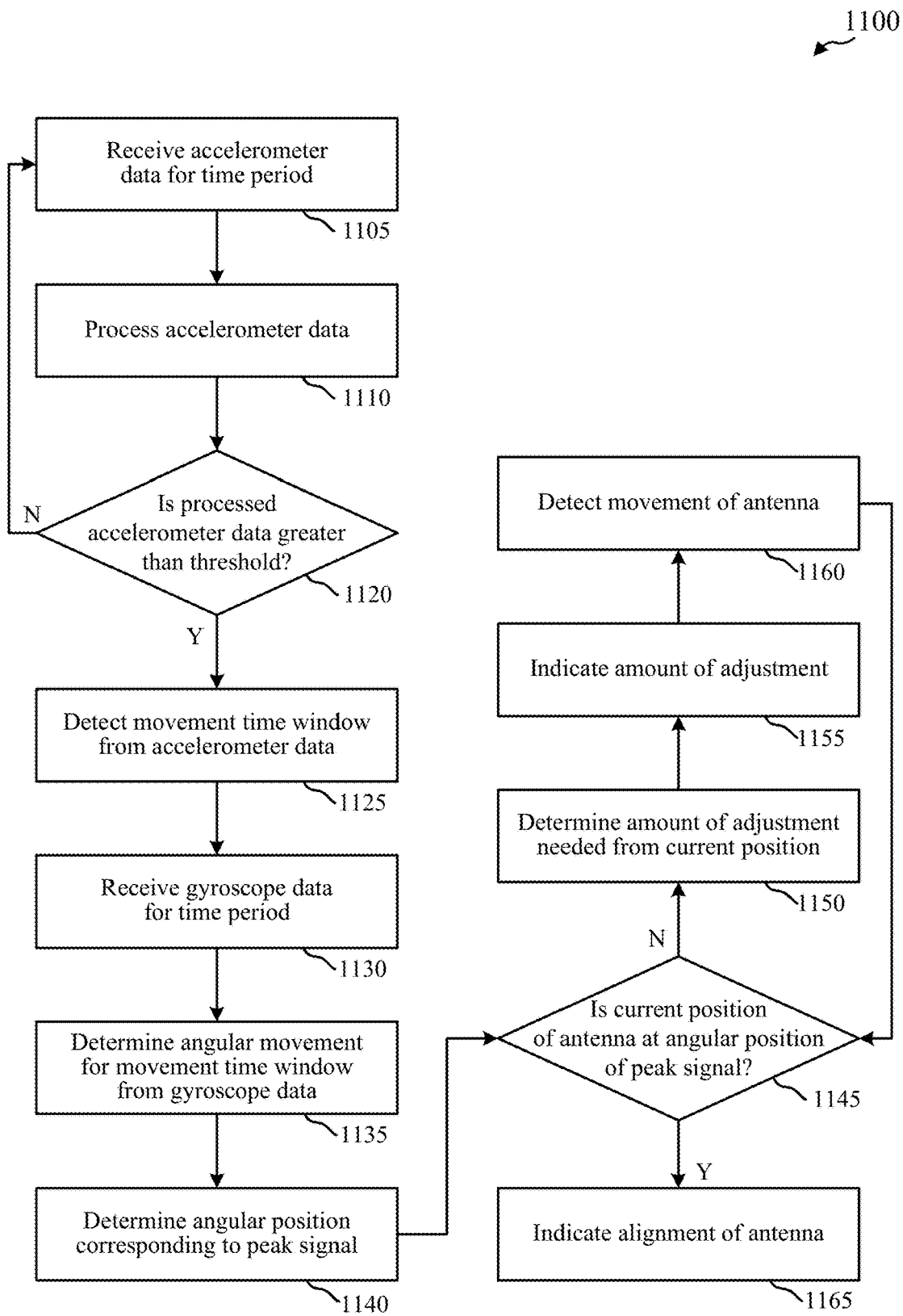
FIG. 11 is a flowchart illustrating an example of a method for aligning an antenna in accordance with various aspects of the disclosure.

FIG. 11 is a flowchart illustrating an example of a method 1100 for aligning an antenna in accordance with various aspects of the disclosure. For clarity, the method 1100 is described below with reference to aspects of the movement detection device 405 described with reference to FIG. 4, 5A, 6 or 9. In some examples, the movement detection device may execute sets of codes to control the functional elements of the movement detection device to perform the functions described below. Additionally or alternatively, the movement detection device may perform of the functions described below using multi-purpose hardware. In various examples, the functionality of the movement detection device may be spread across multiple devices.

The method 1100 provides an example for sensor data processing in aligning an antenna to a peak return link antenna gain. The method 1100 includes receiving accelerometer data for a time period (1105). The time period may be a few seconds while an installer positions the antenna. The accelerometer data for the time period may be processed (1110). The processing may include, for example, filtering the accelerometer data with a high-pass filter. The processing may further include performing an envelope function (e.g., absolute value, filtering, etc.) on the filtered accelerometer data. The method 1100 may query whether the processed accelerometer data is greater than (or greater than or equal to) a pre-determined threshold (1120). If the processed accelerometer data is less than (or less than or equal to) the pre-determined threshold, the method 1100 may return to receive accelerometer data for another time period (11050). If the processed accelerometer data is greater than (or greater than or equal to) the pre-determined threshold, the method 1100 proceeds to block 1125.

The method 1100 may detect a movement time window from the accelerometer data (1125). The movement time window may be determined from a time period that the processed accelerometer data is above the threshold.

The method 1100 may include receiving gyroscope data for the time period (1130). In some examples, the method 1100 receives gyroscope data for the movement time window. The gyroscope data may be processed and analyzed to remove drift. The method 1100 may determine an angular movement for the movement time window from the gyroscope data (1135).

The method 1100 may further determine an angular position corresponding to a peak signal, such as a peak return link signal strength (1140). The method 1100 may use the gyroscope data and information relating to the peak signal to determine which angular position the antenna was in when the peak signal was received or calculated from other angular positions.

The method 1100 may determine whether a current position of the antenna is the same as or within a threshold distance of the angular position of the peak antenna gain (1145). If the antenna is currently located within the threshold distance (which may be less than a degree or a tenth of a degree, for example), the method 1100 indicates the antenna is aligned (1465).

If the antenna is not currently located within the threshold distance, the method 1100 includes determining an amount of adjustment needed from the current position to reach the aligned angular position (1150). The method 1100 may indicate an amount of the adjustment needed, such as an output of positioning feedback that indicates a number of turns of an adjustment knob (1155). The method 1100 may wait to detect movement of the antenna (1160). Once movement is detected, the method 1100 may again determine whether a new current position of the antenna is within a threshold distance as the aligned angular position (1145). The method 1100 may continue to provide positioning feedback until the method 1100 determines that the antenna is aligned. Once the antenna is determined to be aligned, the method 1100 may provide an indication of alignment of the antenna (1165).

Once the beam of the antenna is sufficiently pointed at the satellite, the installer can immobilize the mounting bracket assembly to preclude further movement of the antenna. Once all the bolts and brackets are tightened, the installer may pull the reflector fairly hard in one or more directions (e.g., along four points of the reflector) to ensure that the antenna returns to its original position. If the antenna does not return to its original position, the installer may have to reposition the antenna and ensure the mounting bracket assembly is immobilized. In some examples, the method 1100 includes outputting a verification of immobilization testing when the movement detection device detects the installer has pulled on the antenna in the one or more directions and the position of the antenna has returned to within the threshold distance of the aligned angular position.

The operation(s) of the method 1100 may be performed using the movement detection device described with reference to FIG. 4, 5A, or 6. The method 1100 may be for use in aligning a satellite antenna in a satellite communication system. It should be noted that the method 1100 is just one implementation and that the operations of the method 1100 may be rearranged or otherwise modified such that other implementations are possible.

Figure 12:
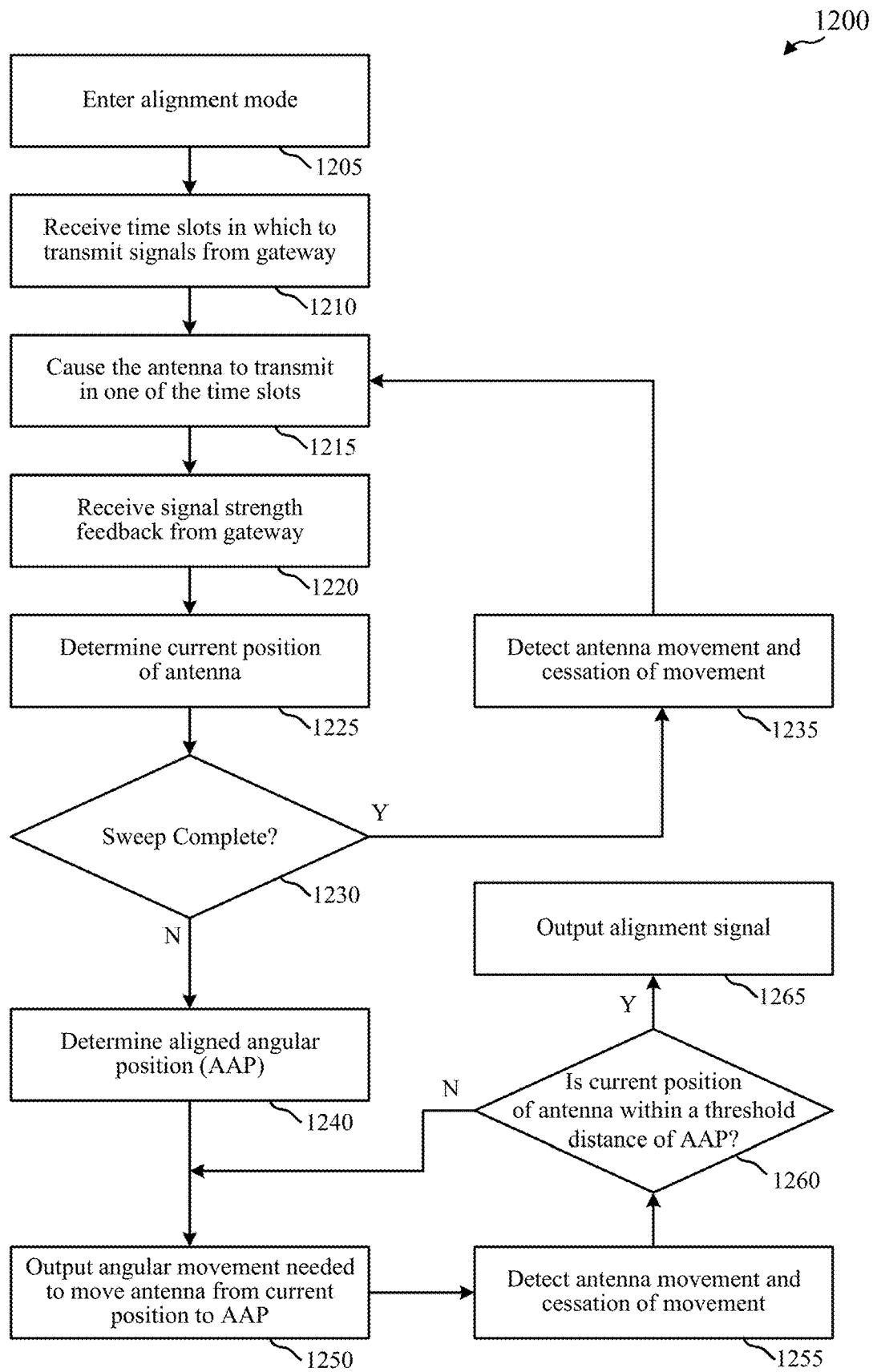
FIG. 12 is a flowchart illustrating another example of a method for aligning an antenna in accordance with various aspects of the disclosure.

FIG. 12 is a flowchart illustrating another example of a method 1200 for aligning an antenna in accordance with various aspects of the disclosure. For clarity, the method 1200 is described below with reference to aspects of the movement detection device 405 described with reference to FIG. 4, 5A, 6 or 9. In some examples, the movement detection device may execute sets of codes to control the functional elements of the movement detection device to perform the functions described below. Additionally or alternatively, the movement detection device may perform of the functions described below using multi-purpose hardware. In various examples, the functionality of the movement detection device may be spread across multiple devices.

The method 1200 may begin with the movement detection device, or antenna, entering an alignment mode (1205). The alignment mode may instruct the movement detection device to analyze sensor data and determine a position of the antenna to assist in aligning the antenna. Once in the alignment mode, the method 1200 receives, from a gateway, an allocation of time slots in which the antenna may transmit a radio frequency signal to the target satellite (1210). The method 1200 may cause the antenna to transmit in one of the time slots (1215). For example, the method 1200 may cause the antenna to transmit in a first time slot. For the first time slot, the antenna may transmit from a first position.

The method 1200 may receive signal strength feedback from the gateway (1220). For example, the movement detection device may receive a signal that includes information related to signal strength (e.g., signal strength, SNR, etc.) for the signal transmitted on the first time slot and received at the target satellite from the gateway. The method 1200 may include determining a current position of the antenna (1225). The method 1200 may store the signal strength and the corresponding position for future reference.

The method 1200 may determine if the sweep is complete (1230). If the sweep is not complete (e.g., a peak return link antenna gain has not been detected, etc.) the method 1200 proceeds to block 1235. The method 1200 may detect an antenna movement and cessation of movement (e.g., entering a static phase) (1235). This may refer to one angular positioning step of the antenna being swept through a series of angular positions to check the return link antenna gain for those positions. An installer may reposition the antenna and then pause for the antenna to transmit a radio frequency signal during the next time slot.

The method 1200 may return to block 1215 to transmit in the next time slot (e.g., the second time slot). The method 1200 may repeat blocks 1215, 1220, 1225, 1230, and 1235 until the antenna has transmitted in every allocated time slot. In some examples, less than the allocated time slots may be used. Once at block 1230, the method 1200 proceeds to block 1240 when the sweep is complete. Alternatively, the method 1200 proceeds to block 1240 when it is decided that no more time slots are allocated for transmission.

An aligned angular position for the antenna may be determined (1240) by comparing the amount of movement for the positioning steps and corresponding return link signal antenna gain. The aligned angular position may be determined, for example, by curve-fitting an expected return link antenna gain vs. angle function to the return link antenna gain information and determined angular movements. The curve-fitting function may then be solved for the position corresponding to an estimated peak return link antenna gain.

The method 1200 may output an angular movement needed to move the antenna from a current position to the aligned angular position (1250). The method 1200 may then detect antenna movement and cessation of the movement (1255). The method 1200 determines whether the new current position of the antenna is within a threshold distance of the aligned angular position (1260). If not, the method 1200 repeats blocks 1250, 1255, and 1260 until the antenna is within the threshold distance of the aligned angular position. Once it is, the method 1200 outputs an alignment signal indicating the antenna is aligned (1265).

The operation(s) at blocks 1205-1265 may be performed using the movement detection device described with reference to FIG. 4, 5A, or 6. Thus, the method 1200 may be for use in a satellite communication system. It should be noted that the method 1200 is just one implementation and that the operations of the method 1200 may be rearranged or otherwise modified such that other implementations are possible.

In some examples, aspects from two or more of the methods 1000, 1100, and 1200 may be combined. It should be noted that the methods 1000, 1100, and 1200 are just example implementations, and that the operations of the methods 1000, 1100, and 1200 may be rearranged or otherwise modified such that other implementations are possible.

In embodiments described above, accelerometer data may be analyzed to determine a movement time window and gyroscope data during the movement time window may be analyzed to determine the amount of movement. Alternatively, the techniques described herein may be used in conjunction with other types and/or combinations of sensors mounted on an antenna. For example, in some embodiments, a pair of accelerometers, including a first accelerometer and a second accelerometer, may be used. In this example, accelerometer data from the first accelerometer is analyzed to determine a movement time window and accelerometer data during the movement time window from the second accelerometer is analyzed to determine the amount of movement. As another example, in some embodiments, a pair of gyroscopes, including a first gyroscope and a second gyroscope, may be used. Gyroscope data from the first gyroscope is analyzed to determine the movement time window and gyroscope data from the second gyroscope is analyzed to determine the amount of movement.

As another example, in some embodiments, one or more gyroscopes and one or more accelerometers may be mounted to an antenna in such a manner that gyroscope data may be analyzed to determine a movement time window and accelerometer data during the movement time window may be analyzed to determine an amount of movement. In such a case, a gyroscope may be mounted to determine the movement time window corresponding to rotation of an adjustment knob of a mounting bracket assembly, such as being mounted to the adjustment knob or to a screw that is coupled to the knob. Accelerometer data from an accelerometer located, for example, at the end of an arm of the antenna (or another location offset from the rotation of the particular axis) may then be analyzed to determine the amount of movement during the movement time window. In some embodiments, a first gyroscope may be mounted to detect movement of an azimuth knob and a second gyroscope may be mounted to detect the movement of an elevation knob.

In yet other embodiments, the techniques described herein may be used in conjunction with a single sensor (e.g., an accelerometer, a gyroscope, etc.) mounted on an antenna. For example, sensor data of the single sensor may be analyzed to determine the movement time window, moving drift of the sensor data may be estimated, the estimated moving drive may be subtracted from the sensor data to produce drift corrected sensor data, and the drift corrected sensor data may then be analyzed to determine the amount of movement.

The detailed description set forth above in connection with the appended drawings describes examples and does not represent the only examples that may be implemented or that are within the scope of the claims. The term "example," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for aligning an antenna with a target device, the method comprising:
    performing a first positioning process of the antenna, the first positioning process establishing a first alignment of the antenna based at least in part on a signal quality characteristic of first signals received from the target device;
    performing a second positioning process of the antenna based at least in part on the first alignment of the antenna, the second positioning process comprising:
    transmitting, by the antenna, second signals at a plurality of angular positioning steps;
    capturing sensor data from one or more sensors mounted on the antenna during the plurality of angular positioning steps; and
    establishing a second alignment of the antenna, wherein the second alignment of the antenna is based at least in part on signal strength information for the second signals transmitted at the plurality of angular positioning steps and angular positioning information for the plurality of angular positioning steps determined from the captured sensor data.

2. The method of claim 1, wherein the performing the second positioning process further comprises:
    identifying an amount of adjustment for aligning the antenna from a current angular position to the second alignment of the antenna; and
    providing an adjustment signal indicating the amount of adjustment for aligning the antenna.

3. The method of claim 2, wherein the identifying the amount of adjustment comprises:
    determining that a peak signal strength for the second signals corresponds to an angular position between a first angular positioning step and a second angular positioning step.

4. The method of claim 3, wherein the identifying the amount of adjustment comprises:
    calculating the angular position corresponding to the peak signal strength based on the signal strength information for the first angular positioning step and the signal strength information for the second angular positioning step and the determined amount of angular movement of the antenna between the first angular positioning step and the second angular positioning step.

5. The method of claim 2, wherein providing the adjustment signal used to indicate the amount of adjustment for aligning the antenna comprises providing one or more output signals to use as a visual position reference of the antenna on a device external to the antenna.

6. The method of claim 1, wherein the performing the second positioning process of the antenna further comprises outputting a signal indicating a status of a current angular positioning step relative to a peak crossing for the second signals.

7. The method of claim 1, further comprising:
    determining an orientation of an azimuth axis of the antenna; and
    providing an indication of alignment of the determined orientation of the azimuth axis relative to a vertical axis.

8. The method of claim 1, further comprising:
    performing an initial coarse pointing of the antenna in a general direction of the target device.

9. The method of claim 8, wherein performing the initial coarse pointing is based at least in part on a known latitude and predetermined position data of the target device.

10. The method of claim 1, wherein the target device is a satellite.

11. The method of claim 1, wherein the first signals are received at a first frequency and the second signals are transmitted at a second frequency that is higher than the first frequency.

12. The method of claim 1, wherein the first signals have a first polarization and the second signals have a second polarization that is different than the first polarization.

13. The method of claim 1, wherein the first positioning process is performed without transmitting the second signals from the antenna.

14. An apparatus, comprising:
    an antenna;
    an antenna communications assembly for receiving first signals from a target device and transmitting second signals to the target device;
    one or more sensors mounted on the antenna, wherein the one or more sensors produce sensor data; and a movement detection device coupled with the antenna communications assembly and the one or more sensors, wherein the movement detection device:

establishes a first alignment of the antenna with the target device as part of a first positioning process based at least in part on a signal quality characteristic of the first signals received from the target device; and establishes, based at least in part on the first alignment of the antenna, a second alignment of the antenna with the target device as part of a second positioning process, wherein the second positioning process comprises:

initiating transmission by the antenna communications assembly of the second signals at a plurality of angular positioning steps;

capturing the sensor data from the one or more sensors during the plurality of angular positioning steps; and determining the second alignment of the antenna, wherein the second alignment of the antenna is based at least in part on signal strength information for the second signals transmitted at the plurality of angular positioning steps and angular positioning information for the plurality of angular positioning steps determined from the captured sensor data.

15. The apparatus of claim 14, wherein the one or more sensors mounted on the antenna comprise:

an accelerometer mounted on the antenna, wherein the accelerometer produces accelerometer data; and a gyroscope mounted on the antenna, wherein the gyroscope produces gyroscope data.

16. The apparatus of claim 14, wherein, to establish the second alignment of the antenna, the movement detection device:

identifies an amount of adjustment for aligning the antenna from a current angular position to the second alignment of the antenna; and provides an adjustment signal indicating the amount of adjustment for aligning the antenna.

17. The apparatus of claim 16, wherein, to identify the amount of adjustment, the movement detection device:

determines that a peak signal strength for the second signals corresponds to an angular position between a first angular positioning step and a second angular positioning step.

18. The apparatus of claim 17, wherein, to identify the amount of adjustment, the movement detection device:

calculates the angular position corresponding to the peak signal strength for the second signals based on the signal strength information for the first angular positioning step and the signal strength information for the second angular positioning step and the determined amount of angular movement of the antenna between the first angular positioning step and the second angular positioning step.

19. The apparatus of claim 16, wherein the adjustment signal used to indicate the amount of adjustment for aligning the antenna comprises one or more output signals to use as a visual position reference of the antenna on a device external to the antenna.

20. The apparatus of claim 14, wherein the movement detection device outputs a signal indicating a status of a current angular positioning step relative to a peak crossing for the second signals during the second positioning process.

21. The apparatus of claim 14, wherein the movement detection device further:

determines an orientation of an azimuth axis of the antenna; and provides an indication of alignment of the determined orientation of the azimuth axis relative to a vertical axis.

22. The apparatus of claim 14, wherein, to establish the first alignment of the antenna, the movement detection device outputs an indicator of a coarse pointing of the antenna using a known latitude and predetermined position data of the target device.

23. The apparatus of claim 14, wherein the first signals are received at a first frequency and the second signals are transmitted at a second frequency that is higher than the first frequency.

24. The apparatus of claim 14, wherein the first signals have a first polarization and the second signals have a second polarization that is different than the first polarization.

25. The apparatus of claim 14, wherein the first positioning process is performed without transmitting the second signals from the antenna.

26. An apparatus for aligning an antenna with a target device, comprising:

a processor;

memory in electronic communication with the processor; and instructions stored in the memory and executable by the processor to cause the apparatus to:

establish a first alignment of the antenna with the target device as part of a first positioning process based at least in part on a signal quality characteristic of first signals received by the antenna from the target device; and establish, based at least in part on the first alignment of the antenna, a second alignment of the antenna with the target device as part of a second positioning process, wherein establishing the second alignment comprises:

initiating transmission of second signals via the antenna at a plurality of angular positioning steps;

capturing sensor data from one or more sensors mounted on the antenna during the plurality of angular positioning steps; and determining the second alignment of the antenna, wherein the second alignment of the antenna is based at least in part on signal strength information for the second signals transmitted at the plurality of angular positioning steps and angular positioning information for the plurality of angular positioning steps determined from the captured sensor data.

* * * * *